United States Patent
Ishida

(10) Patent No.: US 11,834,364 B2
(45) Date of Patent: Dec. 5, 2023

(54) CONTACTLESS DIRECTION CONVERTER AND METHOD FOR MANUFACTURING OPTICAL FIBER

(71) Applicant: FUJIKURA LTD., Tokyo (JP)

(72) Inventor: Itaru Ishida, Mie (JP)

(73) Assignee: Fujikura Ltd., Tokyo (JP)

(*) Notice: Subject to any disclaimer, the term of this patent is extended or adjusted under 35 U.S.C. 154(b) by 373 days.

(21) Appl. No.: 16/637,368

(22) PCT Filed: May 31, 2018

(86) PCT No.: PCT/JP2018/020890
§ 371 (c)(1),
(2) Date: Feb. 7, 2020

(87) PCT Pub. No.: WO2019/031031
PCT Pub. Date: Feb. 14, 2019

(65) Prior Publication Data
US 2020/0180996 A1 Jun. 11, 2020

(30) Foreign Application Priority Data
Aug. 8, 2017 (JP) .................................. 2017-153575

(51) Int. Cl.
C03B 37/035 (2006.01)
C03B 37/027 (2006.01)

(52) U.S. Cl.
CPC .......... *C03B 37/027* (2013.01); *C03B 37/035* (2013.01)

(58) Field of Classification Search
CPC ........ C03B 37/02718; C03B 37/02727; C03B 37/032; C03B 37/035
See application file for complete search history.

(56) References Cited

U.S. PATENT DOCUMENTS

2010/0281922 A1* 11/2010 Costello, III ......... C03B 37/032
65/435
2015/0344349 A1* 12/2015 Sato .................... C03B 19/1005
65/84

FOREIGN PATENT DOCUMENTS

| CN | 106186658 A | 12/2016 |
|----|----|----|
| JP | S50-023434 A | 3/1975 |
| JP | S50-23434 A | 3/1975 |
| JP | S62-003037 A | 1/1987 |
| JP | H09-263357 A | 10/1997 |
| JP | 2010-510957 A | 4/2010 |

(Continued)

OTHER PUBLICATIONS

JP62003037A English Translation Performed by McElroy TranIsation Company, Nov. 2010. (Year: 2010).*

(Continued)

*Primary Examiner* — Lisa L Herring
(74) *Attorney, Agent, or Firm* — Osha Bergman Watanabe & Burton LLP

(57) ABSTRACT

A non-contact direction changer includes: a guide groove that guides an optical fiber and changes a direction of advancement of the optical fiber from a first direction to a second direction; a bottom ejection opening at a bottom of the guide groove; and one or more side ejection openings on at least one of opposite side surfaces of the guide groove. A fluid is ejected into the guide groove through the bottom ejection opening. A fluid is ejected into the guide groove through the one or more side ejection openings.

14 Claims, 12 Drawing Sheets

(56) References Cited

FOREIGN PATENT DOCUMENTS

JP          2012150241 A    8/2012
JP           5627723 B2    11/2014

OTHER PUBLICATIONS

International Search Report issued in International Application No. PCT/JP2018/020890, dated Aug. 7, 2018 (2 pages).
International Preliminary Report on Patentability issued in corresponding International Patent Application No. PCT/JP2018/020890, dated Feb. 20, 2020 (14 pages).
Decision of Refusal issued in Japanese Patent Application No. 2018-230204, dated Mar. 31, 2020 (7 pages).
Decision of Refusal issued in Japanese Patent Application No. 2017-153575, dated Sep. 11, 2018 (8 pages).
Notification of Reasons for Refusal issued in Japanese Patent Application No. 2018-230204, dated Dec. 24, 2019 (7 pages).
Notification of Reasons for Refusal issued in Japanese Patent Application No. 2017-153575, dated Jun. 26, 2018 (8 pages).
Notification of Reasons for Refusal issued in Japanese Patent Application No. 2017-153575, dated Apr. 10, 2018 (7 pages).

* cited by examiner

CONTACTLESS DIRECTION CONVERTER AND METHOD FOR MANUFACTURING OPTICAL FIBER

TECHNICAL FIELD

The present invention relates to a non-contact direction changer configured to change the direction of advancement of an optical fiber in a non-contact manner. The present invention also relates to a method of producing an optical fiber with use of a non-contact direction changer.

BACKGROUND

In an optical fiber production line, drawing speed is required to be higher in order to improve the capacity of the production line. The drawing speed is the speed at which a melted preform is extended (drawn). In order to increase the drawing speed, it is necessary to increase the number of cooling apparatuses for cooling a bare fiber melted in a preform furnace and/or the number of curing apparatuses for curing a liquid-state coating applied on the bare fiber.

Note, here, that cooling apparatuses and curing apparatuses are generally arranged in a straight line that extends from the preform furnace. This is because, if a bare fiber or an uncured coating makes contact with a pulley for direction change, there may be troubles like, for example, the bare fiber having damage on its outer surface and/or the coating deforming. If such troubles occur, the resulting optical fiber may lack strength partially. Therefore, in order to increase the number of cooling apparatuses and/or curing apparatuses, it is necessary to increase the length of the straight line that extends from the preform furnace.

However, in many cases, there is only a limited space available within a building. Therefore, the drawing speed can be increased only to a level that can be achieved by extending the straight line within the building. Note that, hereinafter, an intermediate product obtained during production of an optical fiber is also referred to as an optical fiber. Examples of the intermediate product include a bare fiber and an optical fiber whose coating is uncured.

As a technique related to the above issue, Patent Literature 1 discloses a non-contact direction changer for changing the direction of an optical fiber without contacting the optical fiber.

According to the non-contact direction changer disclosed in Patent Literature 1, a fluid is discharged from the bottom of a groove that guides an optical fiber, and thereby the optical fiber is changed in direction while floating in the fluid.

With use of the non-contact direction changer disclosed in Patent Literature 1, the direction of advancement of an optical fiber can be changed in a non-contact manner. This provides an increased degree of flexibility in extending a production line within a limited space.

PATENT LITERATURE

Patent Literature 1

Japanese Patent No. 5627723 (Date of Registration: Oct. 10, 2014)

Incidentally, during production of an optical fiber, the optical fiber is shaken along a direction perpendicular to the direction of advancement thereof, because of vibration of each apparatus provided in the production line, vibration of a drawing tower, vibration of a preform, small fluctuations of drawing tension, and/or the like. Such shaking of the optical fiber is hereinafter referred to as "fiber shaking". In a case of using the foregoing non-contact direction changer, fiber shaking is caused also by, for example, a temporal pulsing of a fluid that allows the optical fiber to float.

However, according to the non-contact direction changer disclosed in Patent Literature 1, if fiber shaking occurs along the width direction of the groove, the optical fiber may contact a side surface of the groove.

SUMMARY

One or more embodiments of the present invention achieve a technique to, in a non-contact direction changer for changing the direction of advancement of an optical fiber in a non-contact manner, reduce the frequency of contact between the optical fiber and side surfaces of a groove that guides the optical fiber.

A non-contact direction changer in accordance with one or more embodiments of the present invention includes: a guide groove configured to guide an optical fiber so that a direction of advancement of the optical fiber changes from a first direction to a second direction; a bottom ejection opening which is provided at a bottom of the guide groove and through which a fluid is ejected into the guide groove; and one or more side ejection openings which are provided on at least one of opposite side surfaces of the guide groove and through which a fluid is ejected into the guide groove.

A method of producing an optical fiber in accordance with one or more embodiments of the present invention includes, in a production line in which an optical fiber is produced by drawing a preform, the step of changing a direction of advancement of the optical fiber with use of the above-described non-contact direction changer.

According to one or more embodiments of the present invention, it is possible to, in a non-contact direction changer for changing the direction of advancement of an optical fiber in a non-contact manner, reduce the frequency of contact between the optical fiber and side surfaces of a groove that guides the optical fiber.

Figure 3:
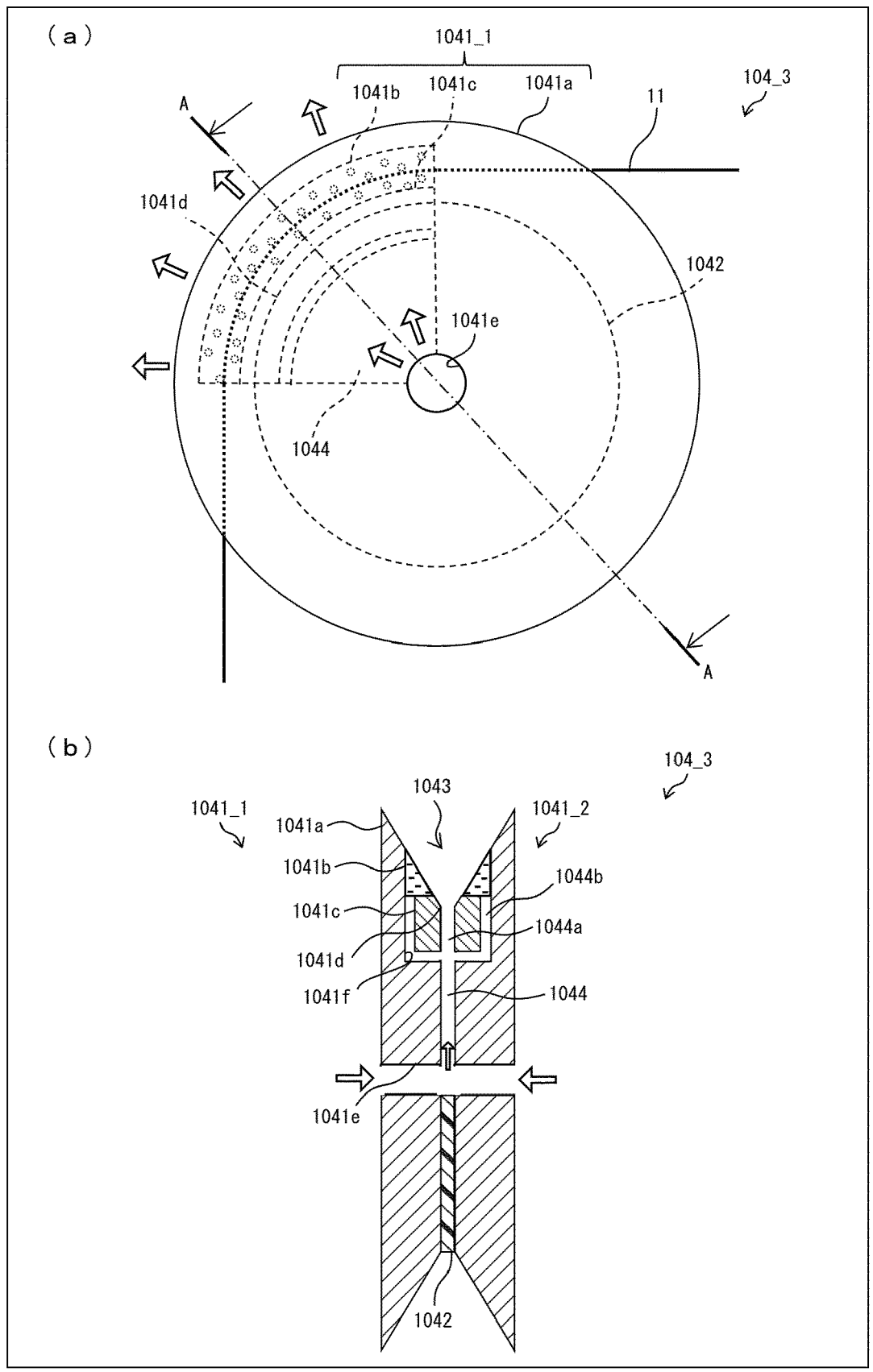

(a) of FIG. 3 is a side view of a non-contact direction changer in accordance with one or more embodiments of the present invention. (b) of FIG. 3 is a cross-sectional view of the non-contact direction changer in accordance with one or more embodiments of the present invention.

Figure 4:
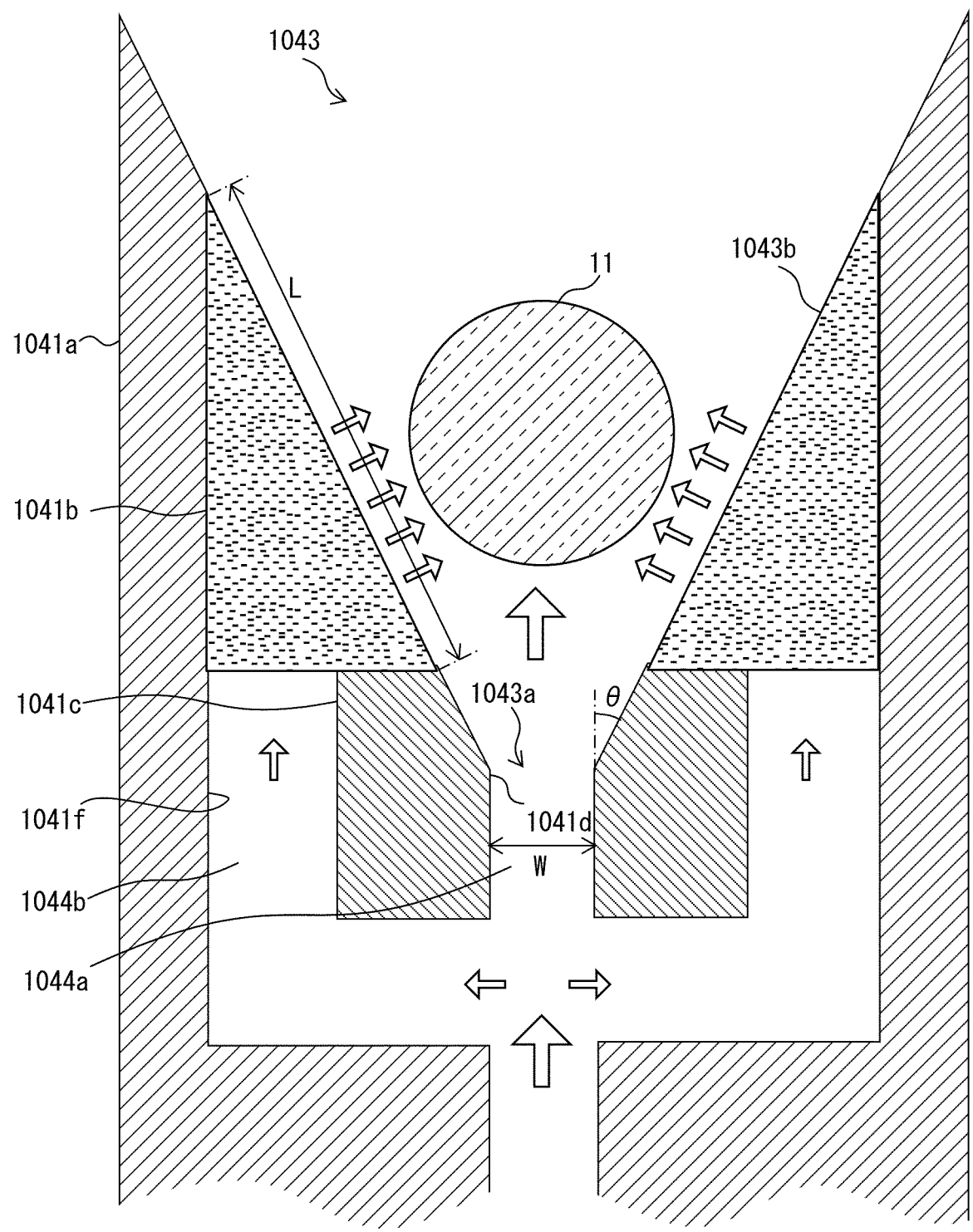

FIG. 4 is a cross-sectional view of a guide groove and its surroundings of the non-contact direction changer in accordance with one or more embodiments of the present invention.

Figure 5:
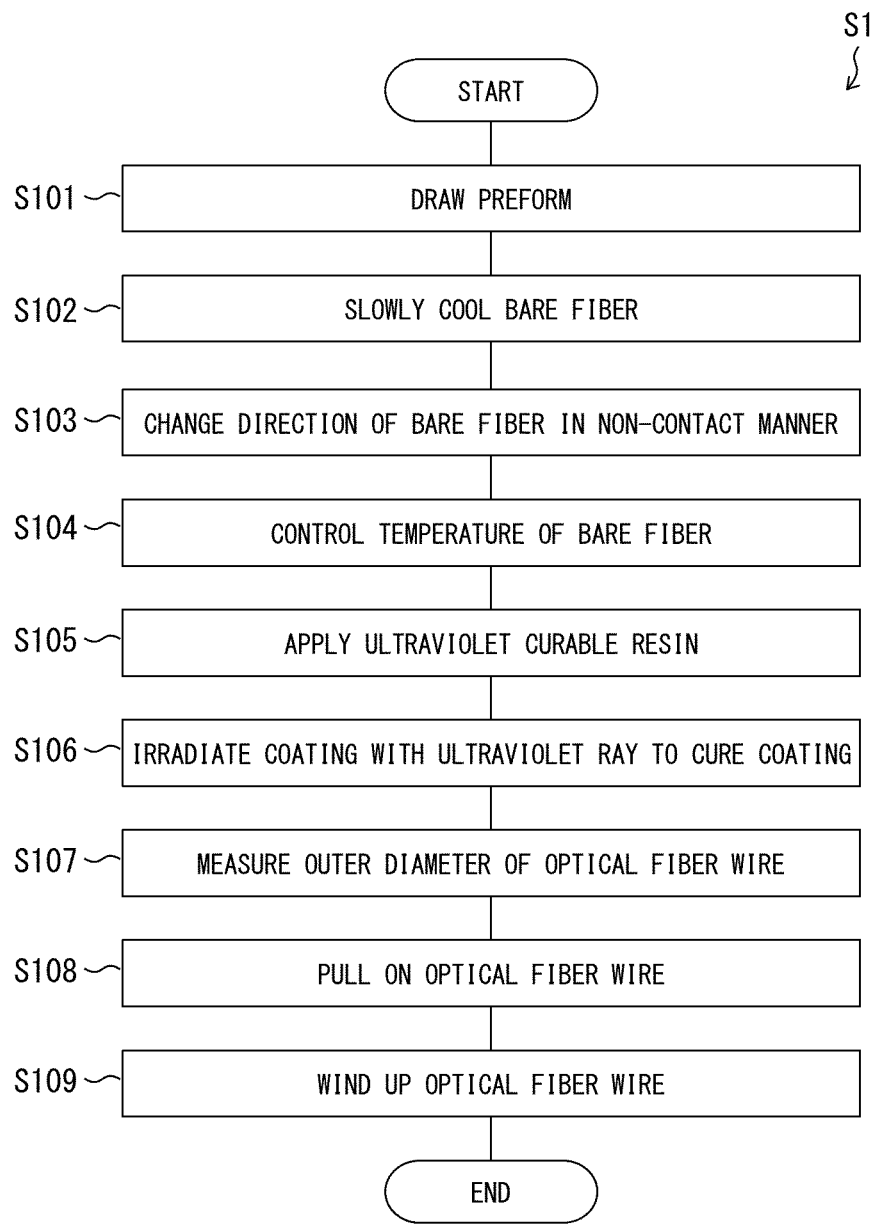

FIG. 5 is a flowchart showing a flow of a method of producing an optical fiber in accordance with one or more embodiments of the present invention.

Figure 6:
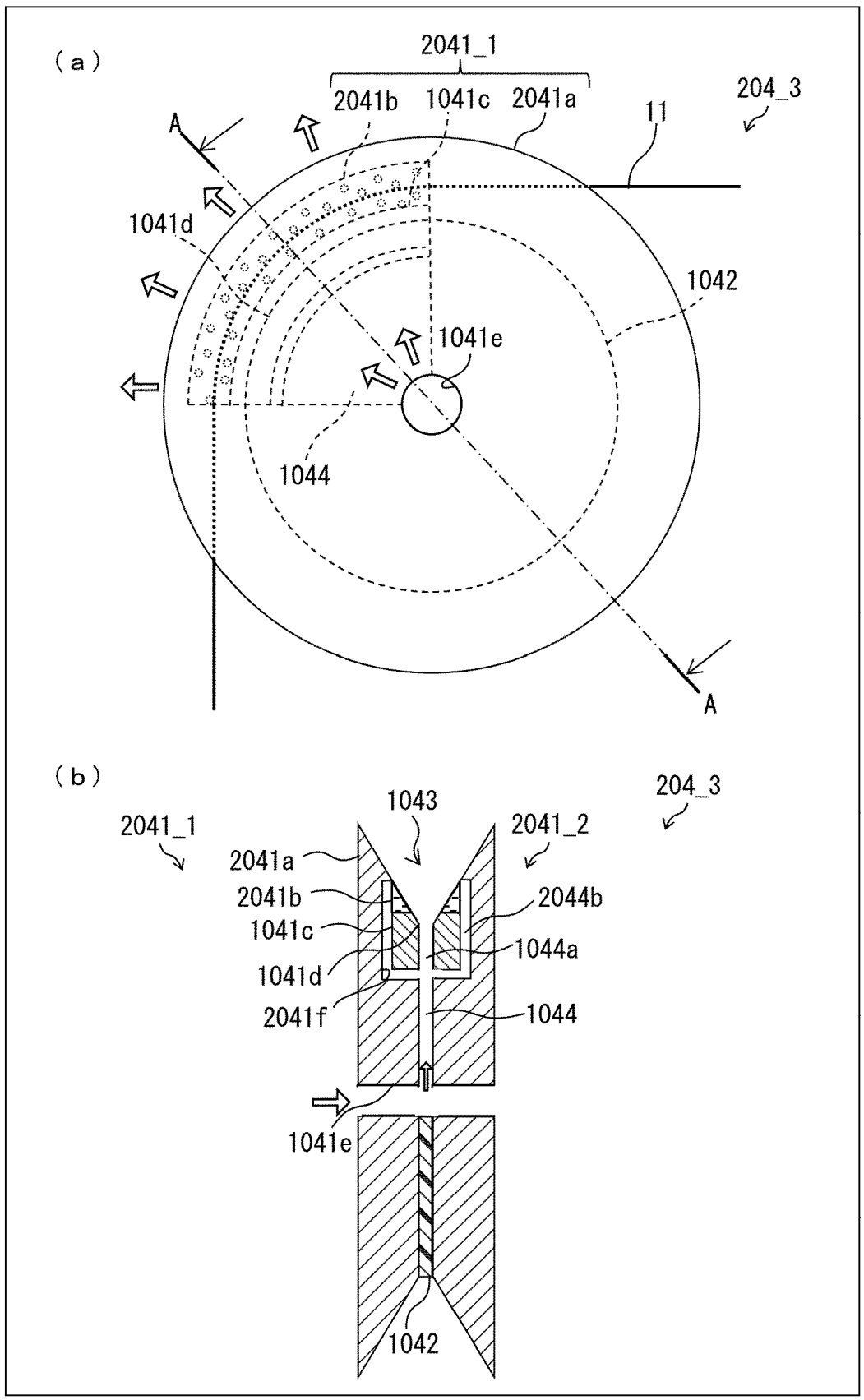

(a) of FIG. 6 is a side view of a non-contact direction changer in accordance with one or more embodiments of the present invention. (b) of FIG. 6 is a cross-sectional view of the non-contact direction changer in accordance with one or more embodiments of the present invention.

Figure 7:
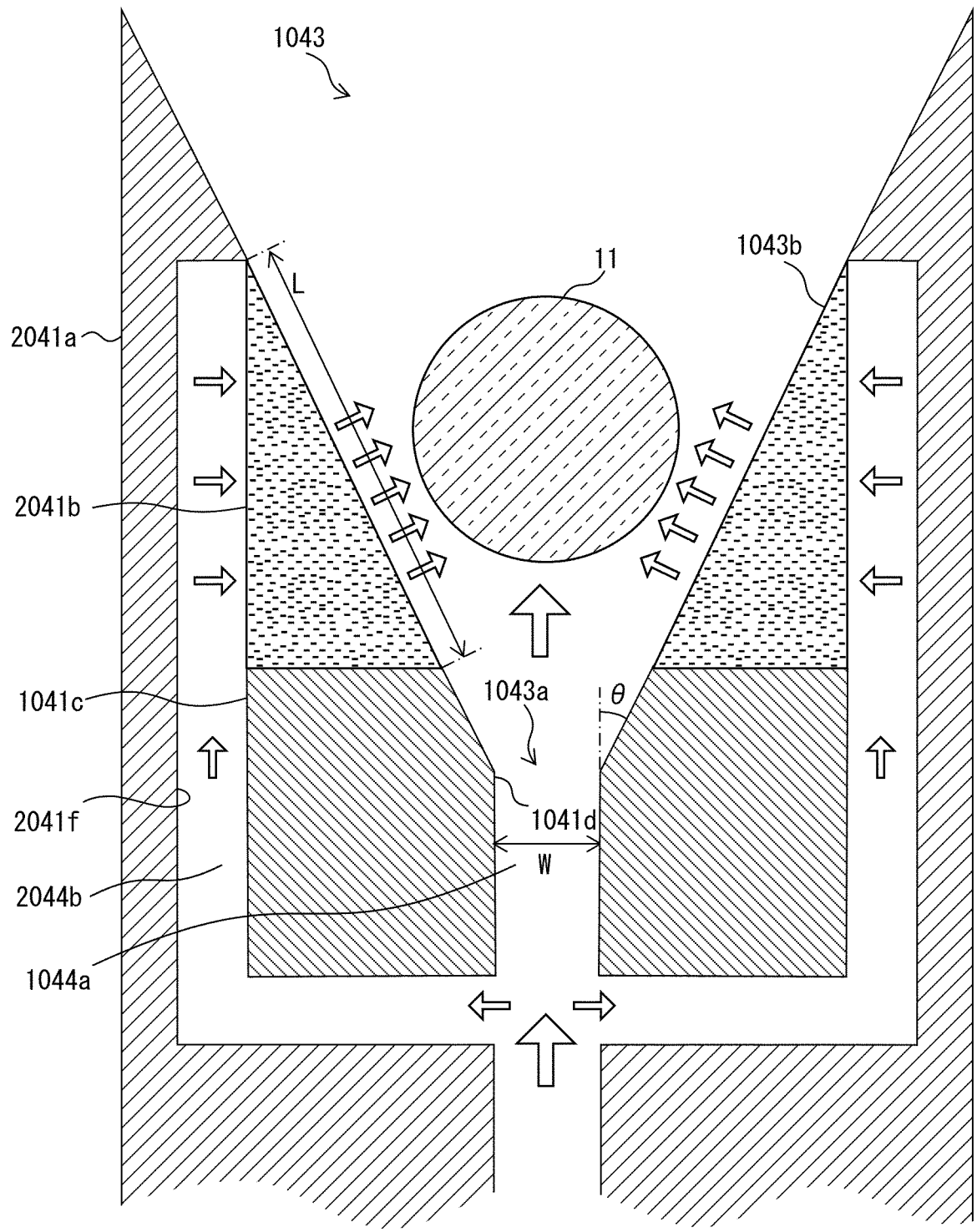

FIG. 7 is a cross-sectional view of a guide groove and its surroundings of the non-contact direction changer in accordance with one or more embodiments of the present invention.

Figure 8:
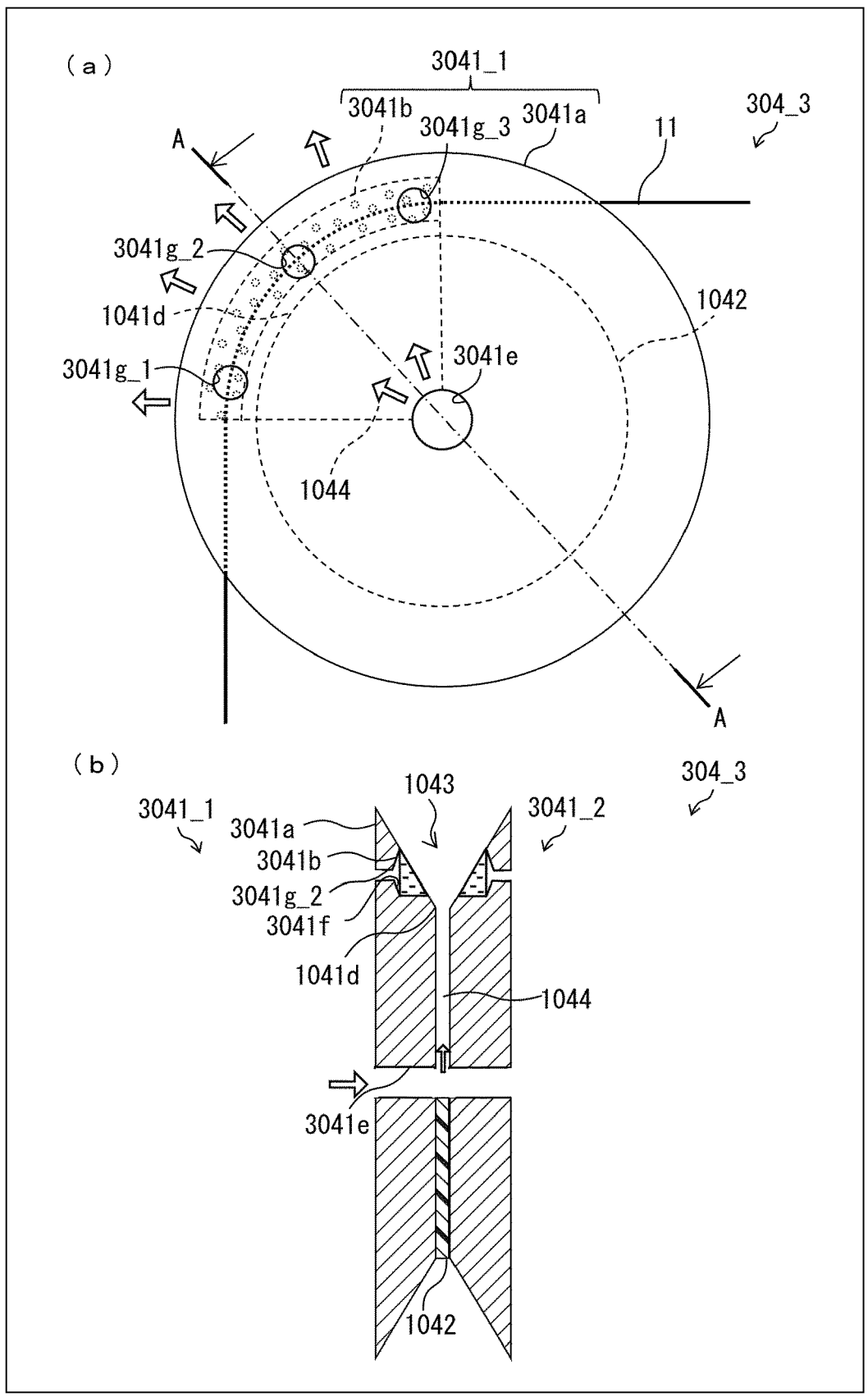

(a) of FIG. 8 is a side view of a non-contact direction changer in accordance with one or more embodiments of the present invention. (b) of FIG. 8 is a cross-sectional view of the non-contact direction changer in accordance with one or more embodiments of the present invention.

Figure 9:
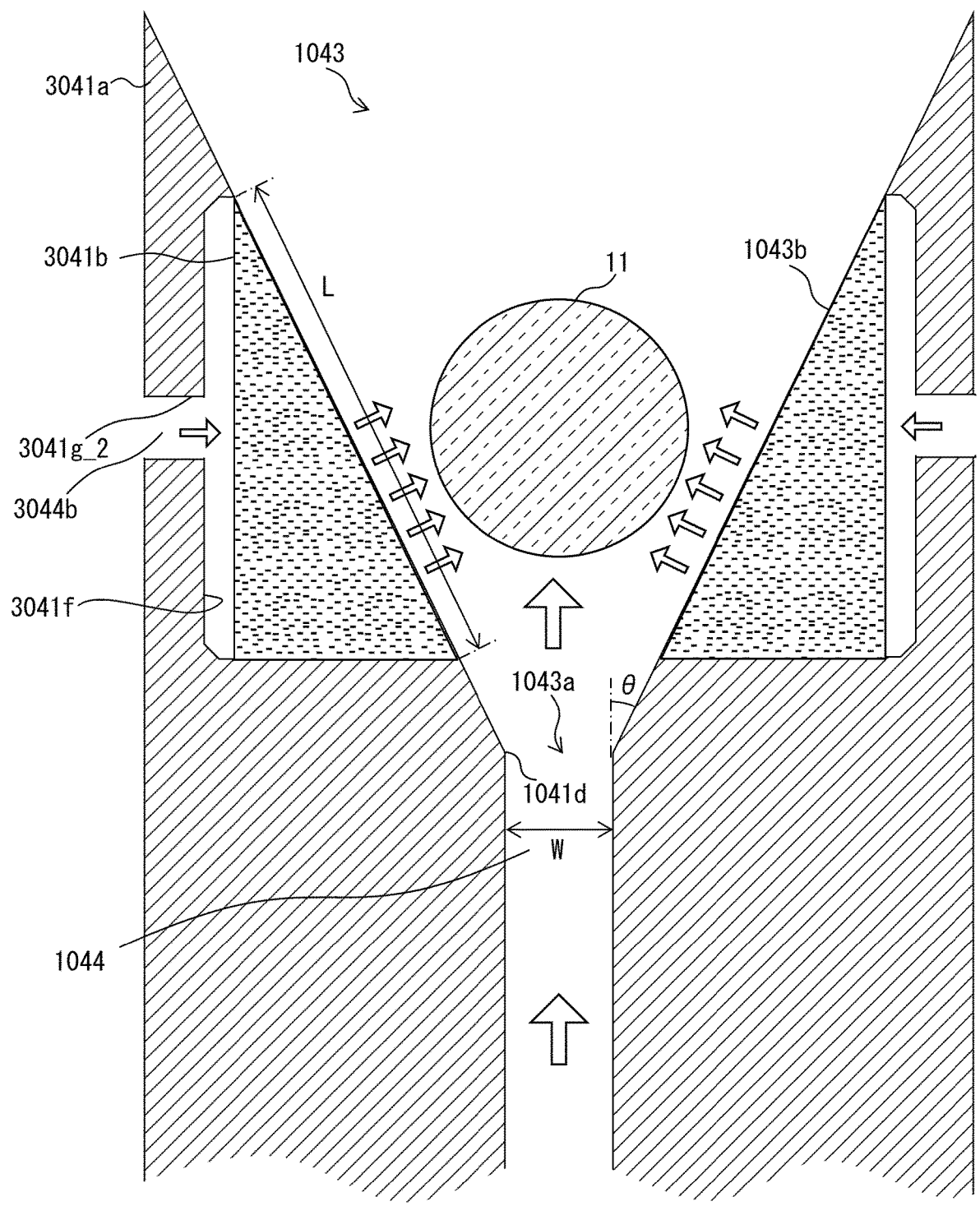

FIG. 9 is a cross-sectional view of a guide groove and its surroundings of the non-contact direction changer in accordance with one or more embodiments of the present invention.

Figure 10:
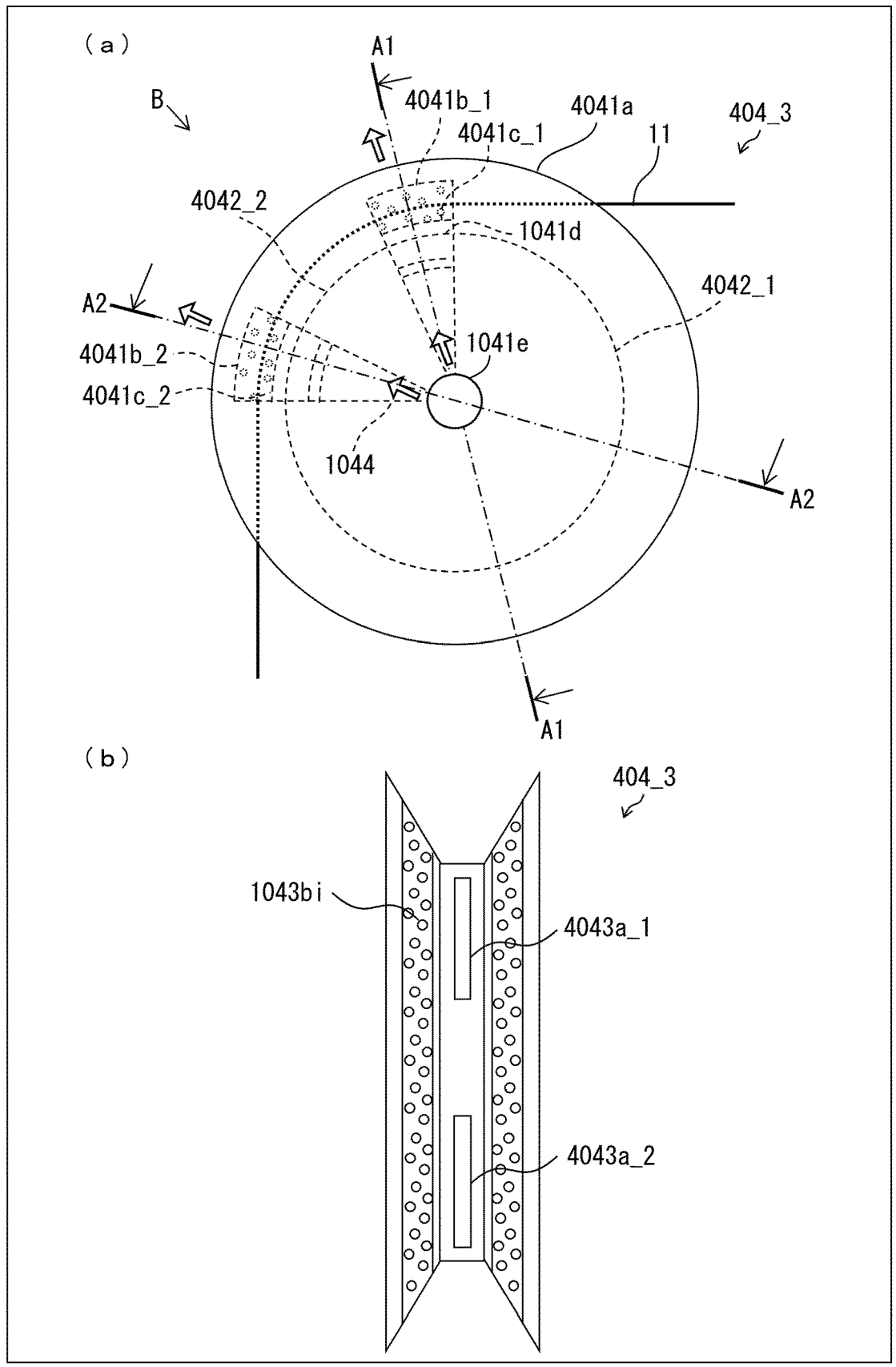

(a) of FIG. 10 is a side view of a non-contact direction changer in accordance with one or more embodiments of the present invention. (b) of FIG. 10 is a top view of the non-contact direction changer in accordance with one or more embodiments of the present invention as seen from above a guide groove.

Figure 11:
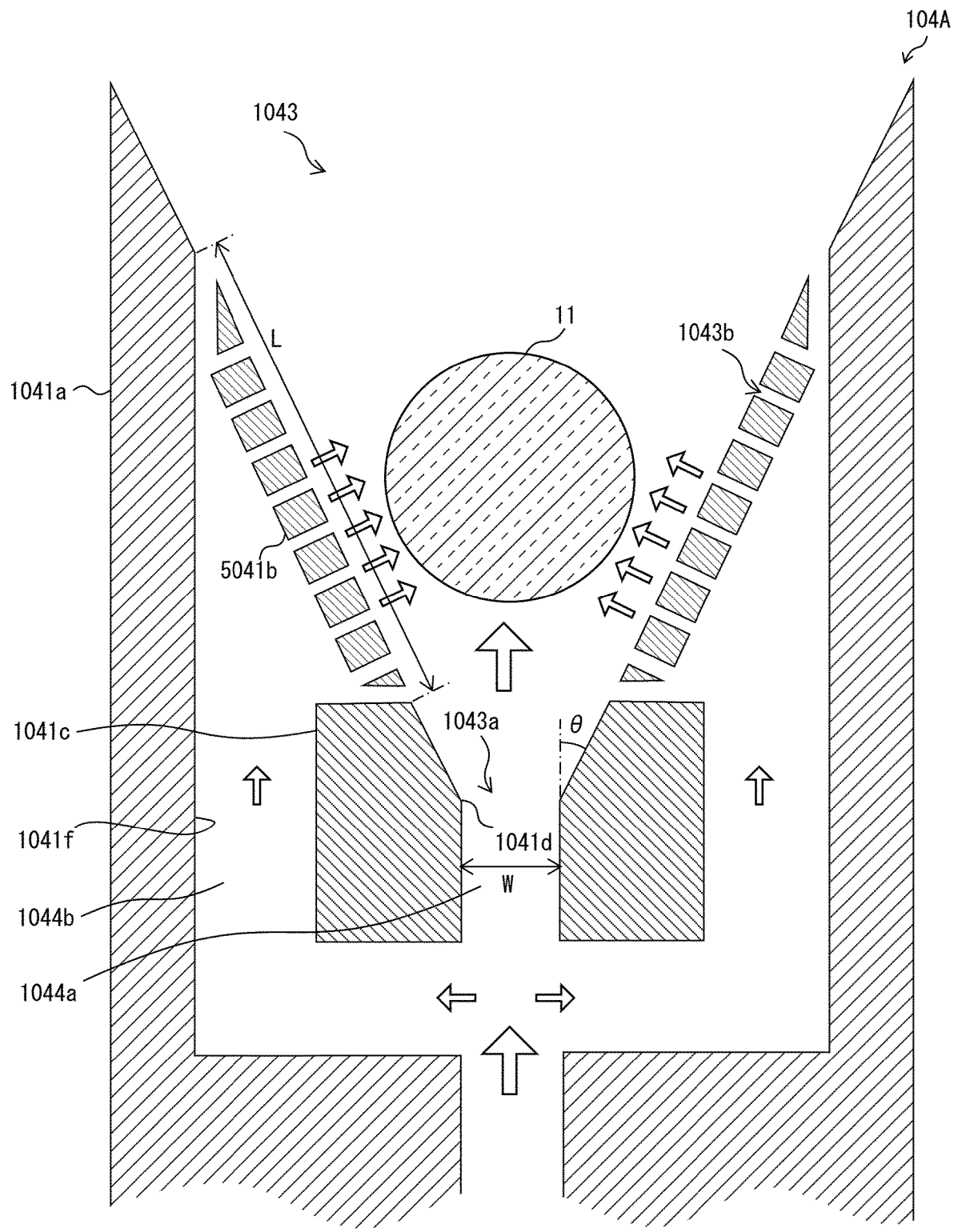

FIG. 11 is a cross-sectional view of a guide groove and its surroundings of a non-contact direction changer in accordance with one or more embodiments of the present invention.

Figure 12:
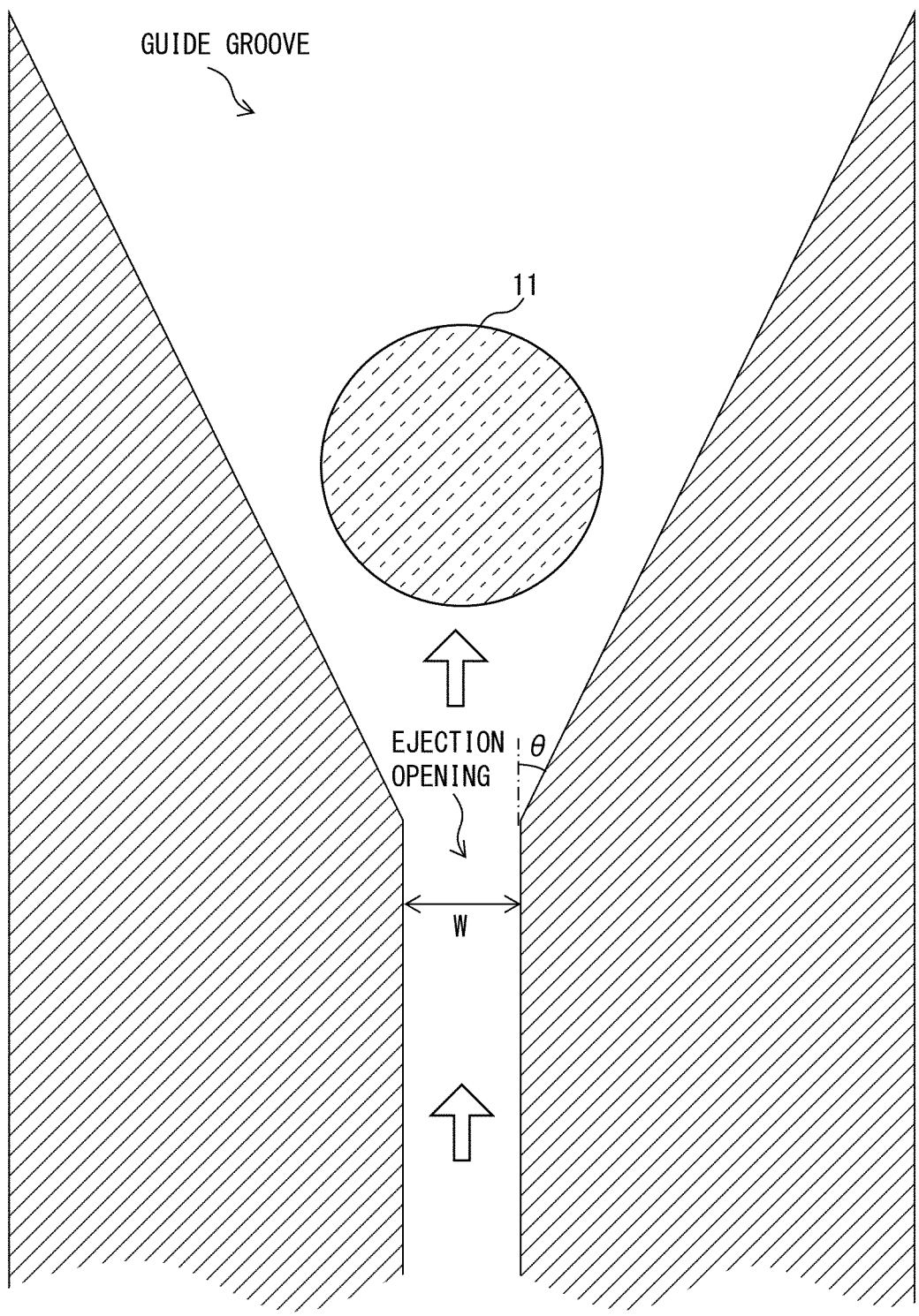

FIG. 12 is a cross-sectional view of a guide groove and its surroundings of a conventional non-contact direction changer.

DETAILED DESCRIPTION

The following description will discuss a non-contact direction changer and a method of producing an optical fiber in accordance with one or more embodiments of the present invention. Note that an optical fiber in the present invention is a general term for a finished optical fiber and an intermediate product obtained during the production of the finished optical fiber. For example, an optical fiber wire, a bare fiber, and an optical fiber wire whose coating is uncured, each of which will be described later in the following embodiments, are each considered an optical fiber in the present invention. Furthermore, in one or more embodiments of the present invention, a fluid used in a non-contact direction changer is air.

[Configuration of Optical Fiber Wire]

Figure 1:
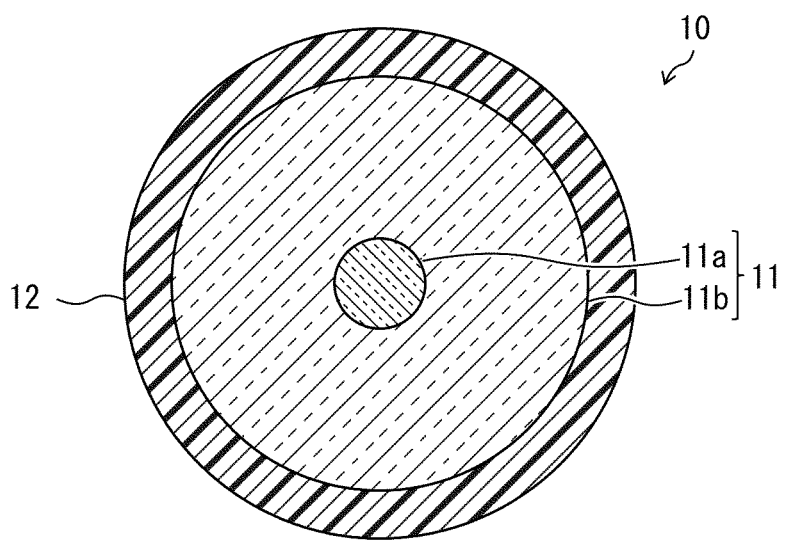
FIG. 1 is a cross-sectional view illustrating an optical fiber wire produced in one or more embodiments of the present invention.

First, the following description discusses an optical fiber wire 10 produced in one or more embodiments of the present invention, with reference to FIG. 1. FIG. 1 is a cross-sectional view illustrating a cross section (which is perpendicular to optical axis) of the optical fiber wire 10.

The optical fiber wire 10 includes: a bare fiber 11 in the form of a circular rod; and a coating 12 that covers the side surface of the bare fiber 11. An example of a configuration of the bare fiber 11 is discussed below. The bare fiber 11 is constituted by, for example; a core 11a in the form of a circular rod; and a cladding 11b that covers the side surface of the core 11a and that is in the form of a circular tube. Both the core 11a and the cladding 11b are made of quartz glass. Note, however, that the quartz glass of the cladding 11b is lower in refractive index than the quartz glass of the core 11a. Such a difference in refractive index between the core 11a and the cladding 11b is formed by, for example: adding a dopant for increasing refractive index (e.g., germanium) to the quartz glass of the core 11a; or adding a dopant for reducing refractive index (e.g., fluorine) to the quartz glass of the cladding 11b. A reason why an arrangement in which the cladding 11b is lower in refractive index than the core 11a is employed is that this arrangement imparts the function of confining light within the core 11a to the bare fiber 11. Note that the configuration of the bare fiber 11 is not limited as such.

The coating 12 is made of an ultraviolet curable resin. The ultraviolet curable resin contains a photopolymerization initiator. The ultraviolet curable resin starts curing upon irradiation with an ultraviolet ray having a wavelength falling within the range of absorption wavelengths of the photopolymerization initiator. Note that the coating 12 may be constituted by a plurality of layers. The coating 12 may be made of a thermosetting resin, which starts curing when polymerization reaction starts upon heating.

(Configuration of Production Apparatus)

Figure 2:
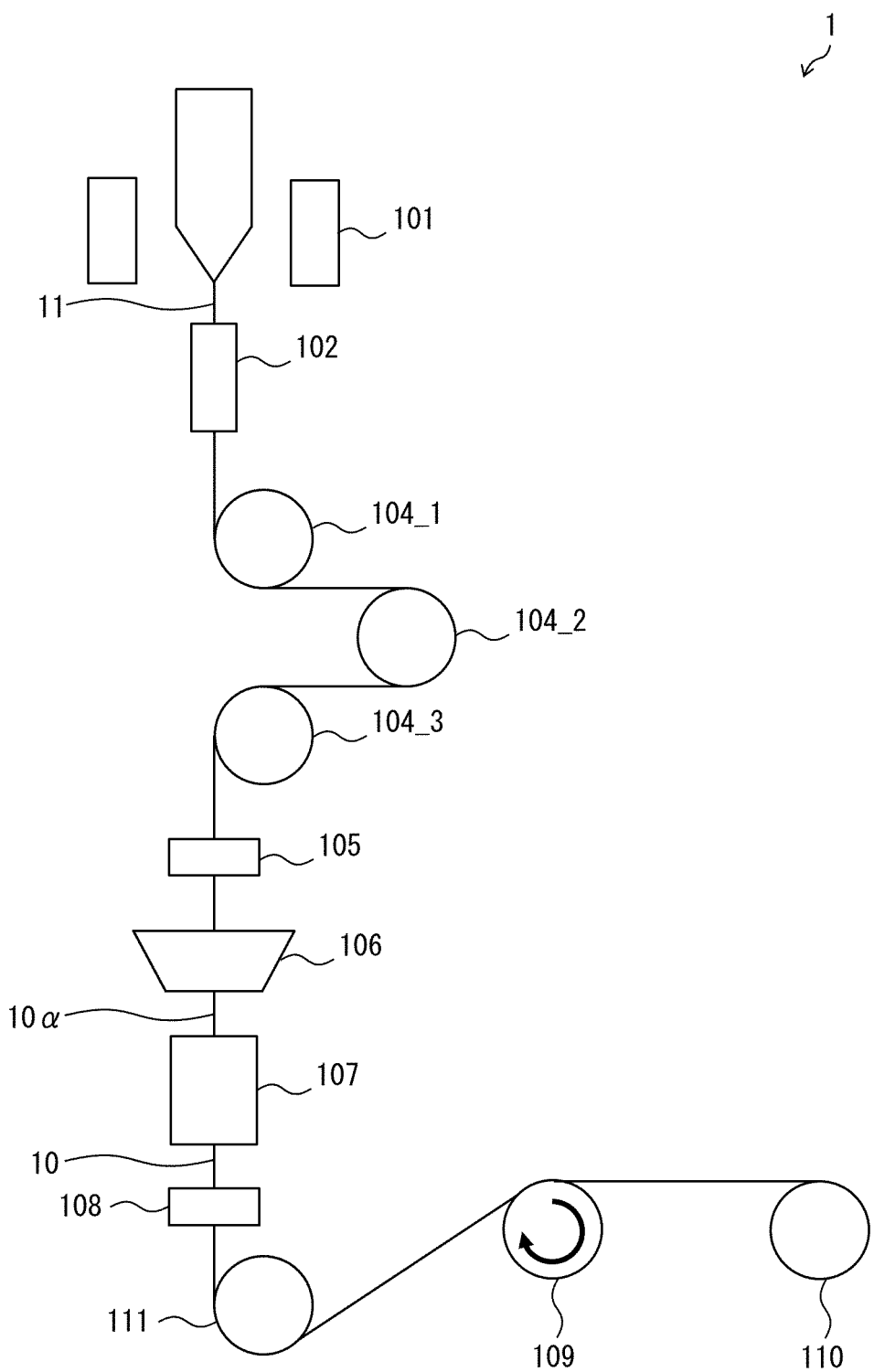
FIG. 2 is a block diagram illustrating a configuration of a production apparatus in accordance with one or more embodiments of the present invention.

Next, the following discusses a production apparatus 1 in accordance with one or more embodiments with reference to FIG. 2. The production apparatus 1 is an apparatus to produce the optical fiber wire 10. FIG. 2 is a block diagram illustrating a configuration of the production apparatus 1.

The production apparatus 1 is an apparatus for producing the optical fiber wire 10 (see FIG. 1), and includes a drawing section 101, a slow cooling section 102, non-contact direction changers 104_1 to 104_3, a temperature control section 105, a coating section 106, a curing section 107, an outer diameter measurer 108, a haul-off section 109, and a take-up section 110. These constituents are arranged in the order named along the path of advancement of the optical fiber wire 10. The production apparatus 1 also includes a pulley 111 provided between the outer diameter measurer 108 and the haul-off section 109.

The drawing section 101 is a means to draw a preform that will become a base of the bare fiber 11. In one or more embodiments, a furnace is used as the drawing section 101. The preform is heated and melted by the furnace. The melted preform is drawn by its own weight. Melting and extending a preform in this manner is referred to as "drawing". The drawing provides the bare fiber 11. The bare fiber 11 is in an uncooled state. The bare fiber 11 is sent into the slow cooling section 102 provided below the drawing section 101.

The slow cooling section 102 is a means to allow the bare fiber 11 to cool slowly. By allowing the bare fiber 11 to cool slowly instead of rapidly, it is possible to reduce transmission loss of the optical fiber wire 10. The transmission loss is one of the important properties of the optical fiber wire 10. In one or more embodiments, a plurality of furnaces are used as the slow cooling section 102. The plurality of furnaces are arranged in a line along the path of advancement of the optical fiber wire 10. The temperature of each furnace is set so that temperature gradually decreases from upstream toward downstream. The bare fiber 11, after slowly cooling in the slow cooling section 102, is sent to one or more non-contact direction changers (e.g., the non-contact direction changers 104_1 to 104_3) provided below the slow cooling section 102. Note that, in one or more embodiments, the non-contact direction changer(s) 104 (described later) have the function of cooling the bare fiber 11; therefore, the non-contact direction changer(s) 104 are provided below the slow cooling section 102. Note, however, that the following arrangement can also be employed: a cooling section constituted by, for example, a cooling cylinder (not illustrated) is provided between the slow cooling section 102 and the non-contact direction changer(s) 104. In a case where such an arrangement is employed, the bare fiber 11, after slowly cooling in the slow cooling section 102, is cooled by the cooling section and is sent to the non-contact direction changers 104_1 to 104_3.

Each of the non-contact direction changers 104_1 to 104_3 changes the direction of advancement of the bare fiber 11 from a first direction to a second direction without contacting the bare fiber 11. The non-contact direction changer 104_1 changes the direction of advancement of the bare fiber 11 by 90 degrees from the direction of gravitational force to a first horizontal direction (rightward direction in FIG. 2) that is perpendicular to the direction of advancement of the bare fiber 11 by 180 degrees from the first horizontal direction to a second horizontal direction (leftward direction in FIG. 2) that is perpendicular to the direction of gravitational force. The non-contact direction changer 104_3 changes the direction of advancement of the bare fiber 11 by 90 degrees from the second horizontal direction to the direction of gravitational force. Hereinafter, each of the non-contact direction changers 104_1 to 104_3 may also be referred to as a non-contact direction changer 104 for short. Note that the angle of direction change by each non-contact direction changer 104 may be any angle. One or more embodiments are described with the example in which three non-contact direction changers 104 are provided between the slow cooling section 102 and the temperature control section 105. Note, however, that the locations of the non-contact direction changers 104 in the production line and the number of the non-contact direction changers 104 may be any locations and any number. The non-contact direction changers 104 will be described later in detail.

Note, here, that the non-contact direction changers 104 also have the function of cooling the bare fiber 11. This function will be described later in detail. The bare fiber 11 passes over the non-contact direction changers 104, and thereby the bare fiber 11 in a sufficiently cooled state is obtained. The bare fiber 11, obtained through the non-contact direction changers 104_1 to 104_3, is sent into the temperature control section 105.

The temperature control section 105 is a means to control the temperature of the bare fiber 11 which advances into the coating section 106 (described later). In one or more embodiments, a furnace is used as the temperature control section 105. Note, here, that the ultraviolet curable resin applied to the bare fiber 11 in the coating section 106 varies in thickness depending on the temperature of the bare fiber 11. In view of this, the temperature control 106, based on the outer diameter of the optical fiber wire 10 measured by the outer diameter measurer 108 (described later). This makes it possible to control the thickness of the ultraviolet curable resin to be applied, and thus possible to make the outer diameter of the resulting optical fiber wire 10 closer to a predetermined value. Note that the non-contact direction changers 104 are also capable of controlling the temperature of the bare fiber 11; therefore, the temperature control section 105 is not essential.

The coating section 106 is a means to apply an uncured ultraviolet curable resin, which is a precursor of the coating 12, to the side surface of the bare fiber 11. In one or more embodiments, a coating die is used as the coating section 106. With the coating die, the uncured ultraviolet curable resin, which is a precursor of the coating 12, is applied to the outer surface of the bare fiber 11. With this, an optical fiber wire 10 whose coating 12 is uncured is obtained. The optical fiber wire 10 in this state is hereinafter referred to as an optical fiber wire 10α. The optical fiber wire 10α, obtained in the coating section 106, is sent into the curing section 107 provided below the coating section 106. Note that, in a case where the coating 12 is constituted by a plurality of layers as described earlier, a plurality of coating dies stacked together may be used as the coating section 106.

The curing section 107 is a means to irradiate the optical fiber wire 10α with an ultraviolet ray to thereby cure the ultraviolet curable resin. In one or more embodiments, an irradiation device including a UV lamp or a UV LED as a light source is used as the curing section 107. Note that the number of irradiation devices constituting the curing section 107 is not limited to one, and may be two or more. The irradiation of the ultraviolet curable resin with an ultraviolet ray provides an optical fiber wire 10 whose coating 12 has been cured. The optical fiber wire 10, obtained in the curing section 107, passes through the outer diameter measurer 108 by which the outer diameter of the optical fiber wire 10 is measured, and then changes its direction at the pulley 111. Then, the optical fiber wire 10 is sent to the haul-off section 109. The pulley 111 changes the direction of advancement of the optical fiber wire 10 from the direction of gravitational force to the first horizontal direction.

The following discusses a case where the coating 12 is constituted by a plurality of layers. For example, assume that the coating 12 is constituted by the following two layers: a first coating layer covering the outer surface of the bare fiber 11; and a second coating layer covering the outer surface of the first coating layer. In this case, two foregoing coating sections 106 and two foregoing curing sections 107 may be provided. Note, here, that the two coating sections 106 are referred to as coating sections 106_1 and 106_2, whereas the two curing sections 107 are referred to as curing sections 107_1 and 107_2. In this case, in place of the foregoing coating section 106 and curing section 107, the coating section 106_1, the curing section 107_1, the coating section 106_2, and the curing section 107_2 are arranged in the order named along the path of advancement of the optical fiber wire 10. With this, the first coating layer is applied and cured while passing through the coating section 106_1 and the curing section 107_1, whereas the second coating layer is applied and cured while passing through the coating section 106_2 and the curing section 107_2. Note that how each layer is applied and cured in a case where the coating 12 is constituted by a plurality of layers is not limited to the above arrangement.

The haul-off section 109 is a means to pull on the optical fiber wire 10 at a specific pulling speed. As used herein, the term "pulling speed" refers to the length of the optical fiber wire 10 pulled on by the haul-off section 109 per unit time. In accordance with the pulling speed, the drawing speed (which is the speed at which the preform is melted and drawn) is controlled. In one or more embodiments, a capstan is used as the haul-off section 109. The optical fiber wire 10, pulled on by the haul-off section 109, is sent to the take-up section 110.

The take-up section 110 is a means to take up the optical fiber wire 10. In one or more embodiments, a take-up drum is used as the take-up section 110.

(Configuration of Non-Contact Direction Changer)

Next, the following description will discuss, using the non-contact direction changer 104_3 as an example, the non-contact direction changers 104 with reference to FIGS. 3 to 5. (a) of FIG. 3 is a side view of a non-contact direction changer 104. (b) of FIG. 3 is a cross-sectional view of the non-contact direction changer 104 taken along line A-A in (a) of FIG. 3. FIG. 4 is a cross-sectional view of a guide groove 1043 (described later) and its surroundings.

As illustrated in (a) and (b) of FIG. 3, the non-contact direction changer 104 includes two plates 1041_1 and 1041_2 and a sealing member 1042. The two plates 1041_1 and 1041_2 are in the form of a circular disc having the same size when seen from side, and overlap each other such that their peripheries are aligned with each other. Note, however, that the two plates 1041_1 and 1041_2 have a gap between them, through which air passes. Hereinafter, each of the two plates 1041_1 and 1041_2 may also be referred to as a plate 1041 for short. Note that surfaces, which face each other, of the respective two plates 1041 may be referred to as inner surfaces of the respective plates 1041. Also note that surfaces, which face away from each other, of the respective two plates 1041 may be referred to as outer surfaces of the respective plates 1041.

Each plate 1041 includes a base member 1041*a*, a porous member 1041*b*, and a passage splitting member 1041*c*. The inner surfaces of the two plates 1041, extending from their centers to taper start positions 1041*d*, are arranged so as to be substantially parallel to each other. Each of the two plates 1041 tapers such that the width of the gap between the inner surfaces of the two plates 1041 increases from the taper start positions 1041*d* toward the periphery. Hereinafter, a portion, which extends from the center to the taper start position 1041*d*, of each plate 1041 is referred to as a parallel face, whereas a face that forms a taper is referred to as a taper face. The taper faces have a gap between them, which constitutes a guide groove 1043 for guiding the bare fiber 11. The guide groove 1043 will be described later in detail. Note that each taper start position 1041*d* is set at an appropriate position in the radial direction of the plate 1041.

The base member 1041*a* is made of, for example, a metal such as steel use stainless (SUS). The base member 1041*a* has a supply hole 1041*e* at its center, which is a through-hole extending from the outer surface to the inner surface. The supply hole 1041*e* is externally supplied with air. The air supplied to the supply hole 1041*e* passes through a passage 1044 formed between the two plates 1041, and flows outward from the peripheries of the plates 1041. Hollow arrows in (a) and (b) of FIG. 3 schematically represent the directions in which air flows. Note that, although (b) of FIG. 3 illustrates two supply holes 1041*e*, the number of supply holes 1041*e* may be one. In this case, one of the two base members 1041*a* may have the supply hole 1041*e* and the other may have no supply holes 1041*e*.

The passage 1044 is constituted by a portion, in the form of a sector, of the gap between the two plates 1041. The portion in the form of a sector has a central angle which is equal to the angle of direction change. Note that the gap between the two plates 1041, except for the passage 1044, is sealed by the sealing member 1042 (described later).

The base member 1041*a* has a recess 1041*f* in a part, which faces the passage 1044, of its inner surface. The recess 1041*f* is, when seen from side, in the shape of a partial ring having a central angle of 90 degrees. Furthermore, as illustrated in (b) of FIG. 3, the recess 1041*f* is in the shape of a trapezoid in cross section. The recess 1041*f* has the porous member 1041*b* and the passage splitting member 1041*c* disposed and fixed therein. The taper face of each plate 1041 is constituted by surfaces of the base member 1041*a*, of the porous member 1041*b*, and of the passage splitting member 1041*c*, which are flush with each other. The parallel face of each plate 1041 is constituted by surfaces of the base member 1041*a* and of the passage splitting member 1041*c*. The porous member 1041*b* and the passage splitting member 1041*c* will be described later in detail.

The porous member 1041*b* is, as illustrated in (a) of FIG. 3, in the shape of a partial ring having a central angle of 90 degrees when seen from side. Furthermore, the porous member 1041*b* is, as illustrated in (b) of FIG. 3, in the shape of a triangle in cross section. The porous member 1041*b* is located near the periphery of the partial-ring-shaped recess 1041*f*, and is fixed to the base member 1041*a*. The porous member 1041*b* has a face that is a part of the taper face of the inner surface of the plate 1041. Furthermore, one face of the porous member 1041*b*, opposite the face that is part of the taper face, is disposed such that no gap forms between the one face and the surface of the recess 1041*f*. The porous member 1041*b* is made of a porous material such as, for example, porous alumina, porous carbon, porous polymer, and/or the like. In a case where the bare fiber 11 that enters the non-contact direction changer 104 has a high temperature, the porous member 1041*b* may be made of a highly heat resistant porous material such as, for example, among those listed above, porous alumina or porous carbon.

The passage splitting member 1041*c* is, as illustrated in (a) of FIG. 3, in the shape of a partial ring having a central angle of 90 degrees when seen from side. Furthermore, the passage splitting member 1041*c* is, as illustrated in (b) of FIG. 3, in the shape of a pentagon in cross section. The passage splitting member 1041*c* is disposed in a portion, where no porous member 1041*b* is disposed, of the partial-ring-shaped recess 1041*f*, and is fixed to the base member 1041*a*. The passage splitting member 1041*c* has a face that is part of the taper face of the inner surface of the plate 1041. Furthermore, the passage splitting member 1041*c* has another face that is part of the parallel face of the inner surface of the plate 1041. Furthermore, faces of the passage splitting member 1041*c*, opposite the faces which are part of the taper face and the parallel face, respectively, are arranged such that a gap forms between these faces and the surface of the recess 1041*f*. This gap serves to split the passage 1044 of air supplied from the supply hole 1041*e*. Specifically, air supplied from the supply hole 1041*e* is split into (i) a first passage 1044*a* that passes between the parallel faces and (ii) two second passages 1044*b* each of which passes between the surface of the recess 1041*f* and the passage splitting member 1041*c*. The first passage 1044*a* is formed so as to be parallel to the depth direction of the guide groove 1043 at a position short of a bottom ejection opening 1043*a* (described later). Each of the second passages 1044*b* is formed so as to be parallel to the depth direction of the guide groove 1043 at a position short of a side ejection opening group 1043*b* (described later). With this arrangement, the direction of flow of air through the first passage 1044*a*, at the position short of the bottom ejection opening 1043*a*, is a direction that is parallel to the depth direction of the guide groove 1043. Furthermore, the direction of flow of air through each second passage 1044*b*, at a position short of the side ejection opening group 1043*b*, is a direction parallel to the depth direction of the guide groove 1043.

The porous member 1041*b* and the passage splitting member 1041*c* are disposed with no gap between them so that air does not leak out from a gap between them. Furthermore, the taper face, which is formed by the plate 1041, the porous member 1041*b*, and the passage splitting member 1041*c*, is formed such that there are no surface irregularities. This is because the irregularities may cause a turbulent air flow.

The sealing member 1042 seals the gap between the parallel faces of the two plates 1041 except for the portion that serves as the passage 1044. Due to the presence of the sealing member 1042, air supplied from the supply hole 1041*e* is prevented from leaking except into the passage 1044. The sealing member 1042 can be constituted by, for example, an O-ring made of a rubber material or a shim plate made of a metal material.

Next, the following discusses the guide groove 1043 in detail with reference to FIG. 4. As described earlier, the guide groove 1043 is constituted by the gap between the taper faces of the two plates 1041. The guide groove 1043 is formed in peripheral surfaces of the plates 1041, and extends over an area having a central angle which is equal to the angle of direction change.

Furthermore, as illustrated in FIG. 4, the guide groove 1043 has the bottom ejection opening 1043*a* at the bottom thereof. The guide groove 1043 also has the side ejection opening groups 1043*b* on respective opposite side surfaces thereof. Each side ejection opening group 1043*b* is constituted by a plurality of side ejection openings 1043*bi* (i=1, 2, 3, and so on). Each side ejection opening group 1043*b* is provided such that the side ejection openings in a side surface of the guide groove 1043 are dispersed along at least the height direction of the side surface. In one or more embodiments, the gap between the taper start positions 1041*d* of the two plates 1041 constitutes the bottom ejection opening 1043*a*. The bottom ejection opening 1043*a* is an opening in the form of a slit that extends continuously at the bottom of the guide groove 1043. Furthermore, openings of pores at the taper face of the porous member 1041*b* constitute the respective side ejection openings 1043*bi*. Air supplied from the supply hole(s) 1041*e* passes through the first passage 1044*a*, and is discharged into the guide groove 1043 via the bottom ejection opening 1043*a*. Furthermore, air supplied from the supply hole(s) 1041*e* passes through the second passages 1044*b* and pores of the porous members 1041*b,* and is discharged into the guide groove 1043 via the side ejection opening groups 1043*b*.

Note, here, that the direction of flow of air discharged through the side ejection opening group 1043*b* in each of the opposite side surfaces of the guide groove 1043 is substantially normal to the side surface. Furthermore, since each of the side surfaces tapers (slanted) such that the width of the guide groove 1043 increases upward from the bottom of the guide groove 1043, the direction normal to the side surface includes a direction component that goes away from the bottom ejection opening 1043*a*. That is, the direction of flow of air discharged through each side ejection opening group 1043*b* includes a direction component that goes away from the bottom ejection opening 1043*a*.

As such, in one or more embodiments, air that is to be discharged through the bottom ejection opening 1043*a* is supplied from a passage whose direction of extension at a position short of the bottom ejection opening 1043*a* is parallel to the depth direction of the guide groove 1043, whereas air that is to be discharged through each side ejection opening group 1043*b* is supplied from a passage whose direction of extension at a position short of the side ejection opening group 1043*b* is parallel to the depth direction of the guide groove 1043.

The guide groove 1043 keeps the bare fiber 11 disposed within a space defined thereby. The bare fiber 11 advances through the guide groove 1043 while floating above the bottom of the guide groove 1043 due to the pressure of air discharged through the bottom ejection opening 1043*a*.

The guide groove 1043 gradually increases in its width from the bottom upward. A purpose thereof is as follows: the pressure that the bare fiber 11 receives from air discharged through the side ejection openings 1043*bi* decreases with increasing width of the groove, and the bare fiber 11 is thereby prevented from going out of the guide groove 1043.

The guide groove 1043 also has a width and depth that are sufficient to keep the bare fiber 11 disposed within the space defined thereby while preventing the bare fiber 11 from contacting the bottom and the side surfaces. For example, a width W of the guide groove 1043 at the bottom may be less than the diameter of the bare fiber 11. A width of the guide groove 1043 at its topmost part may be greater than the diameter of the bare fiber 11. The depth of the guide groove 1043 may be greater than the diameter of the bare fiber 11.

At least one of the side ejection openings 1043*bi* is smaller in opening size than the bottom ejection opening 1043*a*. Note that the side ejection opening group 1043*b* may include a side ejection opening(s) 1043*bi* having an opening size greater than that of the bottom ejection opening 1043*a*.

Note, here, that opening size in one or more embodiments can be determined by, for example, any of the following techniques. (1) In a case where an opening is in the form of a circle, the diameter of the circle may be used as the opening size. (2) In a case where the opening is not in the form of a circle, the diameter of a circle that is equal in area to this opening may be used as the opening size. Examples of the shape of an opening, for which such a technique of determining the opening size may be applied, include ovals, quadrangles, triangles, and indefinite shapes, in each of which the ratio of a longer dimension to a shorter dimension is equal to or less than a threshold (in other words, the ratio between the longer dimension and the shorter dimension is not extremely large). (3) In a case where an opening is in the form of a slit, the width (i.e., a dimension of a short side of a rectangle that constitutes the slit) may be used as the opening size. Examples of the shape of an opening, for which such a technique of determining the opening size may be applied, include rectangles in each of which the ratio of a longer dimension to a shorter dimension is equal to or greater than a threshold (in other words, the ratio between the longer dimension and the shorter dimension is large enough). (4) In a case where an opening is constituted by a pore of a porous material, the average pore size of the porous material may be used as the opening size. Such an average pore size can be determined by, for example, a mercury intrusion technique in accordance with JIS (Japanese Industrial Standards) R1655; however, the average pore size may be determined by any other method.

In one or more embodiments, the average pore size of the porous material stated in the above item (4) is used as the opening size of the side ejection openings 1043*bi*, and the width of a slit stated in the above item (3) is used as the opening size of the bottom ejection opening 1043*a*. Note that the manner in which the opening size is determined is not limited to those stated in the above items (1) to (4).

With such an arrangement in which the side ejection openings 1043*bi* are smaller in opening size than the bottom ejection opening 1043*a,* the pressure that the bare fiber 11 receives from air discharged through the side ejection openings 1043*bi* is less than the pressure that the bare fiber 11 receives from air discharged through the bottom ejection opening 1043*a*. Furthermore, the flow rate of air discharged through the side ejection opening(s) 1043*bi* is less than the flow rate of air discharged through the bottom ejection opening 1043*a*.

With this arrangement, a small amount of air is discharged toward the bare fiber 11 from substantially the entire area of a portion, constituted by the porous member 1041*b,* of each side surface of the guide groove 1043. This small amount of air makes it possible, even if fiber shaking in the width direction occurs, to reduce the frequency of contact between the bare fiber 11 and the side surfaces. Assume here that the flow rate of air discharged through the side ejection openings 1043*bi* in the side surfaces is substantially equal to or greater than the flow rate of air discharged through the bottom ejection opening 1043*a*. If this is the case, air discharged through each of the side ejection openings 1043*bi* may interfere with air discharged through the bottom ejection opening 1043*a,* and may cause a turbulence of air that serves to allow the bare fiber 11 to float. If this happens, the position of the floating bare fiber 11 may become unstable and become a cause of fiber shaking. As such, if the opening size of each side ejection opening 1043*bi* is greater than the opening size of the bottom ejection opening 1043*a*, it may be impossible to reduce the frequency of contact between the bare fiber 11 and the side surfaces to a sufficient extent.

An average pore size of the porous member 1041*b* may be, for example, not less than 0.1 μm and not more than 500 μm. Note that an average pore size of the porous member 1041*b* can be selected according to, for example, the outer diameter of the bare fiber 11, the pressure of supplied air, and/or the amount of air. For example, a smaller average pore size of the porous member 1041*b* is necessary for a smaller outer diameter of the bare fiber 11. Note, however, that too small an average pore size may result in an increase in pressure loss at the porous member 1041*b* depending on the pressure of supplied air, and may lead to too small an amount of discharged air. Therefore, an average pore size may be found in consideration of the above factors.

Furthermore, the position in the depth direction of and a dimension L of the portion, constituted by the porous member 1041*b*, of each of the opposite side surfaces of the guide groove 1043 are designed so that the portion includes an area that can be approached by the bare fiber 11 if fiber shaking occurs. Such a portion is determined depending on where in the space defined by the guide groove 1043 the bare fiber 11 in the floating state can be kept.

Note that the non-contact direction changer 104 also has the function of cooling the bare fiber 11 by blowing air onto the bare fiber 11 from the bottom ejection opening 1043*a* and the side ejection opening groups 1043*b*. Therefore, in one or more embodiments, the bare fiber 11, which has passed through three non-contact direction changers 104, is in a sufficiently cooled state.

Note that the above description discusses, as an example, the non-contact direction changer 104_3 which carries out a 90-degree direction change. The description for the non-contact direction changer 104_3 also applies to the non-contact direction changer 104_1 which carries out a 90-degree direction change. Furthermore, the description for the non-contact direction changer 104_3 also applies to the non-contact direction changer 104_2 which carries out a 180-degree direction change, except that the central angles of the porous member 1041*b*, of the passage splitting member 1041*c*, of the recess 1041*f*, and of the passage 1044, when seen from side in FIG. 3, are each 180 degrees.

(Method of Producing Optical Fiber Wire)

A method S1 of producing an optical fiber wire 10 is discussed with reference to FIG. 5. FIG. 5 is a flowchart showing the method S1 of producing an optical fiber wire 10. The method S1 is to produce the optical fiber wire 10 (see FIG. 1), and includes the following steps S101 to S109.

Step S101: The drawing section 101 draws a preform that will become a base of the bare fiber 11.

Step S102: The slow cooling section 102 allows the bare fiber 11 obtained from step S101 to cool slowly.

Step S103: Each of the non-contact direction changers 104_1 to 104_3 changes the direction of the bare fiber 11 in a non-contact manner. Specifically, the bare fiber 11 is guided through the guide groove 1043 of each of the non-contact direction changers 104, while being maintained in a floating state by pressure from air discharged through the bottom ejection opening 1043*a*. The bare fiber 11 is, while being guided through the guide groove 1043 of each of the non-contact direction changers 104, kept out of contact with side surfaces because of pressure from air discharged through the side ejection openings 1043*bi*, even if fiber shaking occurs. Furthermore, the bare fiber 11 is cooled by air discharged through the bottom ejection opening 1043*a* and the side ejection openings 1043*bi*. This provides the bare fiber 11 which is in a sufficiently cooled state.

Step S104: The temperature control section 105 controls the temperature of the bare fiber 11 which advances into the coating section 106.

Step S105: The coating section 106 applies an uncured ultraviolet curable resin, which is a precursor of the coating 12, to a side surface of the bare fiber 11 whose temperature has been controlled in step S104. This gives an optical fiber wire 10α.

Step S160: The curing section 107 irradiates the optical fiber wire 10*a* obtained from step S105 with an ultraviolet ray. This cures the ultraviolet curable resin, and thereby gives an optical fiber wire 10.

Step S107: The outer diameter measurer 108 measures the outer diameter of the optical fiber wire 10 obtained from step S106, and supplies, to a control section (not illustrated), a monitor signal indicative of the measured outer diameter. The control section controls the temperature control section 105 to carry out temperature control. The optical fiber wire 10, whose outer diameter has been measured, is changed in its direction of advancement by the pulley 111 from the direction of gravitational force to the first horizontal direction.

Step S108: The haul-off section 109 pulls on, at a specific pulling speed, the optical fiber wire 10 whose direction has been changed in step S107.

Step S109: The take-up section 110 takes up the optical fiber wire 10, pulled on in the step S108, around the take-up drum. This provides the optical fiber wire 10 wound around the take-up drum.

A non-contact direction changer, and a method of producing an optical fiber wire using a non-contact direction changer, according to one or more embodiments are capable of reducing the frequency of contact between a bare fiber and side surfaces of a guide groove even if the bare fiber undergoes fiber shaking when the direction of advancement of the bare fiber is changed in a non-contact manner. Accordingly, one or more embodiments make it possible to extend the bare fiber, which does not have a coating applied thereto, while changing the direction of advancement of the bare fiber, and thus possible to contribute to an increase in drawing speed regardless of the size of a limited space inside a building.

A reason therefor is as follows. A non-contact direction changer in accordance with one or more embodiments has a guide groove that guides a bare fiber so that the direction of advancement of the bare fiber changes from a first direction to a second direction. The guide groove has, at the bottom thereof, a bottom ejection opening through which a fluid is ejected into the guide groove. Furthermore, the guide groove has, on opposite side surfaces thereof, a plurality of side ejection openings through which a fluid is ejected into the guide groove. The plurality of side ejection openings are defined by a porous member. In this arrangement, the average pore size of the porous member which defines the side ejection openings (i.e., opening size of side ejection opening) is less than the width of the bottom ejection opening (i.e., opening size of bottom ejection opening).

With this arrangement, air is discharged toward the bare fiber from substantially the entire area of a portion, constituted by the porous member, of each side surface of the guide groove. Furthermore, the amount of air discharged through each side ejection opening is small because of pressure loss at the porous member. It follows that, in one or more embodiments, a small amount of air discharged through the side ejection openings makes it possible to reduce the frequency of contact between the bare fiber and the side surfaces without causing a turbulence of air that is from the bottom ejection opening and that serves to allow the bare fiber to float, even if fiber shaking of the bare fiber in the width direction of the guide groove occurs.

Furthermore, in one or more embodiments, the direction of flow of a fluid ejected through the side ejection openings in the opposite side surfaces of the guide groove includes a direction component that goes away from the bottom ejection opening. With this arrangement, even if the fiber shaking of the bare fiber in the width direction of the guide groove occurs, the fluid ejected from the side ejection openings makes the bare fiber move upward within the guide groove. Accordingly, one or more embodiments make it possible to prevent the bare fiber from approaching the bottom of the groove by utilizing the air that serves to reduce the frequency of contact between the bare fiber and the side surfaces.

The following description will discuss a production apparatus 2 in accordance with one or more embodiments of the present invention. The production apparatus 2 is different from the production apparatus 1 in that non-contact direction changers 204_1 to 204_3 are used instead of the non-contact direction changers 104_1 to 104_3. The non-contact direction changer 204_1 changes the direction of advancement of the bare fiber 11 by 90 degrees from the direction of gravitational force to the first horizontal direction in the same manner as the non-contact direction changer 104_1. The non-contact direction changer 204_2 changes the direction of advancement of the bare fiber 11 by 180 degrees from the first horizontal direction to the second horizontal direction in the same manner as the non-contact direction changer 104_2. The non-contact direction changer 204_3 changes the direction of advancement of the bare fiber 11 by 90 degrees from the second horizontal direction to the direction of gravitational force in the same manner as the non-contact direction changer 104_3. Hereinafter, each of the non-contact direction changers 204_1 to 204_3 may also be referred to as a non-contact direction changer 204 for short. The other constituent elements are the same as those of the production apparatus 1 discussed with reference to FIG. 2, and therefore illustration of an overall configuration of the production apparatus 2 and description of each of these constituent elements are omitted here.

(Configuration of Non-Contact Direction Changer)

The following discusses the non-contact direction changers 204 using the non-contact direction changer 204_3 as an example. One or more embodiments of the present invention are described with the example in which the side ejection openings 1043bi are supplied with air whose direction of flow at a position short of the side ejection openings 1043bi is the depth direction of the guide groove 1043. In contrast, one or more embodiments are described with the example in which the side ejection openings 1043bi are supplied with air whose direction of flow at a position short of the side ejection openings 1043bi is the width direction of the guide groove 1043.

A configuration of the non-contact direction changer 204 is discussed with reference to FIGS. 6 and 7. (a) of FIG. 6 is a side view of the non-contact direction changer 204. (b) of FIG. 6 is a cross-sectional view of the non-contact direction changer 204 taken along line A-A in (a) of FIG. 6. FIG. 7 is a cross-sectional view of the guide groove 1043 and its surroundings.

The non-contact direction changer 204 is different from the non-contact direction changer 104 in that the non-contact direction changer 204 includes plates 2041_1 and 2041_2 instead of the two plates 1041_1 and 1041_2. Each of the plates 2041_1 and 2041_2 may be hereinafter referred to as a plate 2041 for short. The plate 2041 is different from the plate 1041 in that the plate 2041 includes a base member 2041a and a porous member 2041b instead of the base member 1041a and the porous member 1041b.

The base member 2041a has a recess 2041f instead of the recess 1041f of one or more embodiments. The porous member 2041b is disposed such that a gap forms between (i) one face of the porous member 2041b, opposite the face that is part of the taper face, and (ii) the surface of the recess 2041f. In other words, the recess 2041f is formed such that a gap forms between the surface of the recess 2041f and the porous member 2041b disposed within the recess 2041f.

In this arrangement, air supplied from the supply hole 1041e is split and, as illustrated in FIG. 7, second passages 2044b are formed. Each of the second passages 2044b extends to include the gap between the porous member 2041b and the surface of the recess 2041f, differently from the second passages 1044b of one or more embodiments. With this arrangement, the direction of flow of air passing through each of the second passages 2044b, at a position short of the porous member 2041b, is the width direction of the guide groove 1043.

With this arrangement, the distance traveled by air that passes through the porous member 2041b from the second passage 2044b is less than in a case where air passes through the second passage 1044b in one or more embodiments. This makes it possible to reduce pressure loss that would occur when air passes through the porous member 2041b. Furthermore, the thickness of the porous member 2041b can be considered substantially constant, given that the angle θ at which each plate tapers is very small in practical situations. Note that the thickness of the porous member 2041b here is a dimension of the porous member 2041b in the width direction of the guide groove 1043. Therefore, the above-described arrangement reduces variations in distance travelled by air that passes through the porous member 2041b from the second passage 2044b, in the direction of a dimension L of the porous member 2041b. This reduces variations in amount of air discharged through the side ejection openings 1043bi, in the depth direction of the guide groove 1043.

Note that the non-contact direction changer 204 also has the function of cooling the bare fiber 11, as with the non-contact direction changer 104 in accordance with one or more embodiments.

The description above discusses, as an example, the non-contact direction changer 204_3 which carries out a 90-degree direction change. The description for the non-contact direction changer 204_3 also applies to the non-contact direction changer 204_1 which carries out a 90-degree direction change. Furthermore, the description for the non-contact direction changer 204_3 also applies to the non-contact direction changer 204_2 which carries out a 180-degree direction change, except that the central angles of the porous member 2041b, of the passage splitting member 1041c, of the recess 2041f, and of the passage 1044, when seen from side in FIG. 6, are each 180 degrees.

A method of producing an optical fiber wire 10 with use of the thus-configured non-contact direction changers 204_1 to 204_3 is the same as the method S1 of producing an optical fiber wire 10 in accordance with one or more embodiments of the present invention discussed with reference to FIG. 5.

A non-contact direction changer, and a method of producing an optical fiber wire with use of a non-contact direction changer, of one or more embodiments reduce variations in amount of air discharged through side ejection openings, in the depth direction of a guide groove. Thus, according to one or more embodiments, even if the height at which a bare fiber is kept within the guide groove undergoes small fluctuations, it is possible to allow an appropriate amount of air to be discharged through a side ejection opening(s) corresponding to the height at which the bare fiber is kept.

The following description will discuss a production apparatus 3 in accordance with one or more embodiments of the present invention. The production apparatus 3 is different from the production apparatus 1 of one or more embodiments of the present invention in that non-contact direction changers 304_1 to 304_3 are used instead of the non-contact direction changers 104_1 to 104_3. The non-contact direction changer 304_1 changes the direction of advancement of the bare fiber 11 by 90 degrees from the direction of gravitational force to the first horizontal direction in the same manner as the non-contact direction changer 104_1. The non-contact direction changer 304_2 changes the direction of advancement of the bare fiber 11 by 180 degrees from the first horizontal direction to the second horizontal direction in the same manner as the non-contact direction changer 104_2. The non-contact direction changer 304_3 changes the direction of advancement of the bare fiber 11 by 90 degrees from the second horizontal direction to the direction of gravitational force in the same manner as the non-contact direction changer 104_3. Hereinafter, each of the non-contact direction changers 304_1 to 304_3 may also be referred to as a non-contact direction changer 304 for short. The other constituent elements are the same as those of the production apparatus 1 discussed with reference to FIG. 2, and therefore illustration of an overall configuration of the production apparatus 3 and description of each of these constituent elements are omitted here.

(Configuration of Non-Contact Direction Changer)

The following description will discuss the non-contact direction changers 304 using the non-contact direction changer 304_3 as an example. One or more embodiments of the present invention are described with the example in which air is supplied to side ejection openings 1043*bi* through a passage whose direction of extension at a position short of the side ejection openings 1043*bi* is parallel to the depth direction of the guide groove 1043. One or more embodiments are described with the example in which air is supplied to side ejection openings 1043*bi* through a passage whose direction of extension at a position short of the side ejection openings 1043*bi* is parallel to the width direction of the guide groove 1043. That is, in one or more embodiments the side ejection openings 1043*bi* are supplied with air whose direction of flow at a position short of the side ejection openings 1043*bi* is the width direction of the guide groove 1043.

A configuration of the non-contact direction changer 304 is discussed with reference to FIGS. 8 and 9. (a) of FIG. 8 is a side view of the non-contact direction changer 304. (b) of FIG. 8 is a cross-sectional view of the non-contact direction changer 304 taken along line A-A in (a) of FIG. 8. FIG. 9 is a cross-sectional view of the guide groove 1043 and its surroundings.

The non-contact direction changer 304 is different from the non-contact direction changer 104 in that the non-contact direction changer 304 includes plates 3041_1 and 3041_2 instead of the two plates 1041_1 and 1041_2. Each of the plates 3041_1 and 3041_2 may be hereinafter referred to as a plate 3041 for short. The plate 3041 is different from the plate 1041 in that the plate 3041 includes a base member 3041*a* and a porous member 3041*b* instead of the base member 1041*a* and the porous member 1041*b*, and in that the plate 3041 includes no passage splitting member 1041*c*.

The base member 3041*a* has a recess 3041*f* instead of the recess 1041*f* in accordance with one or more embodiments. The recess 3041*f* is in the form of a partial ring having a central angle of 90 degrees when seen from side, similarly to the recess 1041*f*. Note, however, that the size of the partial ring when the recess 3041*f* is seen from side is equal to or substantially equal to the size of a partial ring when the porous member 3041*b* is seen from side. Furthermore, the base member 3041*a* has a first supply hole 3041*e* and second supply holes 3041*g*_1 to 3041*g*_3. The first supply hole 3041*e* is configured similarly to the supply hole 1041*e* in accordance with one or more embodiments. The second supply holes 3041*g*_1 to 3041*g*_3 are through-holes that extend from the outer surface to the recess 3041*f*. The second supply holes 3041*g*_1 to *g*_3 are dispersed along a circumferential direction within a portion, which corresponds to the recess 3041*f*, of the outer surface. This reduces variations in amount of air discharged into the guide groove 1043 through the porous members 3041*b* via the side ejection openings 1043*bi*, in the circumferential direction. Note that, although one or more embodiments are described with the example in which three second supply holes 3041*g*_1 to 3041*g*_3 are arranged along the circumferential direction, the number of second supply holes may be any number.

The porous member 3041*b* is disposed such that a gap forms between (i) one face of the porous member 3041*b* opposite the face that is part of the taper face and (ii) the surface of the recess 3041*f*, similarly to the porous member 2041*b* in accordance with one or more embodiments. In other words, the recess 3041*f* is formed such that a gap forms between the surface of the recess 3041*f* and the porous member 3041*b* disposed within the recess 3041*f*.

Furthermore, as illustrated in FIG. 9, each second passage 3044*b*, through which air is supplied to side ejection openings 1043*bi*, is constituted by (i) a space defined by one of the second supply holes 3041*g*_1 to *g*_3 and (ii) a gap between the porous member 3041*b* and the surface of the recess 3041*f*. The direction of flow of air passing through the second passage 3044*b*, at a position short of the porous member 3041*b*, is the width direction of the guide groove 1043. That is, the second passage 3044*b* extends so as to be parallel to the width direction of the guide groove 1043 at a position short of the side ejection openings 1043*bi*.

Note that, in one or more embodiments, the total flow rate of air supplied from the second supply holes 3041*g*_1, the second supply holes 3041*g*_2, and the second supply holes 3041*g*_3 to the side ejection opening groups 1043*b* may be less than the flow rate of air supplied from the first supply holes 3041*e* to the bottom ejection opening 1043*a*.

Note that the non-contact direction changer 304 also has the function of cooling the bare fiber 11, as with the non-contact direction changer 104 in accordance with one or more embodiments.

The description above discusses, as an example, the non-contact direction changer 304_3 which carries out a 90-degree direction change. The description for the non-contact direction changer 304_3 also applies to the non-contact direction changer 304_1 which carries out a 90-degree direction change. Furthermore, the description for the non-contact direction changer 304_3 also applies to the non-contact direction changer 304_2 which carries out a 180-degree direction change, except that the central angles of the porous member 3041b, of the recess 3041f, and of the passage 1044, when seen from side in FIG. 8, are each 180 degrees.

A method of producing an optical fiber wire 10 with use of the thus-configured non-contact direction changers 304_1 to 304_3 is the same as the method S1 of producing an optical fiber wire 10 in accordance with one or more embodiments of the present invention discussed with reference to FIG. 5.

A non-contact direction changer in accordance with one or more embodiments reduces variations in amount of air discharged through side ejection openings, in the depth direction of a guide groove. According to one or more embodiments second supply holes are further included for supplying air to side ejection openings, separately from a first supply hole for supplying air to a bottom ejection opening. Therefore, according to one or more embodiments, it is possible to use respective different air sources for supplying air to the first supply hole and for supplying air to the second supply holes. Thus, according to one or more embodiments, it is possible to control the amount of air discharged through the bottom ejection opening and the amount of air discharged through the side ejection openings independently of each other. Accordingly, a reduction in total amount of supplied air may be achieved.

Furthermore, according to one or more embodiments any passage splitting member is not required and only fabricating the first supply hole and the second supply holes in a base member is required. Thus, according to one or more embodiments production cost reduction with a simple configuration is achieved.

The following description will discuss a production apparatus 4 in accordance with one or more embodiments of the present invention. The production apparatus 4 is different from the production apparatus 1 of one or more embodiments of the present invention in that non-contact direction changers 404_1 to 404_3 are used instead of the non-contact direction changers 104_1 to 104_3. The non-contact direction changer 404_1 changes the direction of advancement of the bare fiber 11 by 90 degrees from the direction of gravitational force to the first horizontal direction in the same manner as the non-contact direction changer 104_1. The non-contact direction changer 404_2 changes the direction of advancement of the bare fiber 11 by 180 degrees from the first horizontal direction to the second horizontal direction in the same manner as the non-contact direction changer 104_2. The non-contact direction changer 404_3 changes the direction of advancement of the bare fiber 11 by 90 degrees from the second horizontal direction to the direction of gravitational force in the same manner as the non-contact direction changer 104_3. Hereinafter, each of the non-contact direction changers 404_1 to 404_3 may also be referred to as a non-contact direction changer 404 for short. The other constituent elements are the same as those of the production apparatus 1 discussed with reference to FIG. 2, and therefore illustration of an overall configuration of the production apparatus 4 and description of each of these constituent elements are omitted here.

(Configuration of Non-Contact Direction Changer)

The following description will discuss the non-contact direction changers 404 using the non-contact direction changer 404_3 as an example. In one or more embodiments of the present invention, the non-contact direction changer 104 includes the passage 1044 in the form of a sector with a central angle which is equal to the angle of direction change. In contrast, according to the non-contact direction changer 404, a portion in the form of a sector with a central angle equal to the angle of direction change is divided into a plurality of passages, e.g., passages 4044_1 and 4044_2, which are arranged along the circumferential direction. Note that, although one or more embodiments are described with the example in which the number of passages into which the portion in the form of a sector is divided is two, the number of such passages may be any number. Also note that the central angle of a sector when each passage is seen from side is not limited to that illustrated in (a) of FIG. 10, and may be any angle.

A configuration of the non-contact direction changer 404 is discussed with reference to FIG. 10. (a) of FIG. 10 is a side view of the non-contact direction changer 404. (b) of FIG. 10 is a top view of the non-contact direction changer 404 of (a) of FIG. 10 seen from above (in direction B) the guide groove 1043.

The non-contact direction changer 404 is different from the non-contact direction changer 104 in that the non-contact direction changer 404 includes plates 4041_1 and 4041_2 instead of the two plates 1041_1 and 1041_2. Each of the plates 4041_1 and 4041_2 may be hereinafter referred to as a plate 4041 for short. The plate 4041 is different from the plate 1041 in that the plate 4041 includes a base member 4041a instead of the base member 1041a, that the plate 4041 includes porous members 4041b_1 and 4041b_2 instead of the porous member 1041b, that the plate 4041 includes passage splitting members 4041c_1 and 4041c_2 instead of the passage splitting member 1041c, and that the plate 4041 includes sealing members 4042_1 and 4042_2 instead of the sealing member 1042.

The base member 4041a has recesses 4041f_1 and 4041f_2 instead of the recess 1041f in accordance with one or more embodiments. The recesses 4041f_1 and 4041f_2 are obtained by dividing the recess 1041f in accordance with one or more embodiments into pieces which are arranged along the circumferential direction.

The recess 4041f_1 has the porous member 4041b_1 and the passage splitting member 4041c_1 disposed therein. The recess 4041f_2 has the porous member 4041b_2 and the passage splitting member 4041c_2 disposed therein.

The sealing member 4042_1 is configured similarly to the sealing member 1042. The sealing member 4042_2 seals a space between the passages 4044_1 and 4044_2. This prevents air from flowing into the gap between the plates 4041_1 and 4041_2, except into the passages 4044_1 and 4044_2.

Note that a cross-sectional view of the non-contact direction changer 404 in (a) of FIG. 10 taken along line A1-A1 or line A2-A2 is the same as the cross-sectional view of the non-contact direction changer 104 discussed earlier with reference to (b) of FIG. 3. Also note that the details of configurations of the base member 4041a, the porous member 4041b_1, the passage splitting member 4041c_1, and the recess 4041f_1 of the passage 4044_1 are the same as those discussed earlier in one or more embodiments of the present invention with reference to FIG. 3. Similarly, the details of configurations of the base member 4041a, the porous member 4041b_2, the passage splitting member 4041c_2, and the recess 4041f_2 of the passage 4044_2 are the same as those discussed earlier in one or more embodiments of the present invention with reference to (b) of FIG. 3.

In a case where such an arrangement is employed, the guide groove 1043 has, at its bottom, a plurality of bottom ejection openings, e.g., bottom ejection openings 4043a_1 and 4043a_2, as illustrated in (b) of FIG. 10.

In one or more embodiments, the relationship in terms of opening size between the side ejection openings 1043bi and the bottom ejection openings 4043a_1 and 4043a_2 may be specified in the following manner (1) or (2), for example. (1) The opening size of at least one of the side ejection openings 1043bi may be smaller than the opening size of each of the bottom ejection openings 4043a_1 and 4043a_2. Note, however, that, in this case, each side ejection opening group 1043b may include a side ejection opening(s) 1043bi having a larger opening size than that of each of the bottom ejection openings 4043a_1 and 4043a_2. (2) The opening size of at least one of the side ejection openings 1043bi may be smaller than a statistical value (such as minimum value, average value, maximum value) of the opening sizes of the bottom ejection openings 4043a_1 and 4043a_2. Note, however, that, in this case, each side ejection opening group 1043b may include a side ejection opening(s) 1043bi having an opening size greater than a statistical value of the opening sizes of the bottom ejection opening 4043a_1 and 4043a_2.

Note that the non-contact direction changer 404 also has the function of cooling the bare fiber 11, as with the non-contact direction changer 104 in accordance with one or more embodiments.

The description above discusses, as an example, the non-contact direction changer 404_3 which carries out a 90-degree direction change. The description for the non-contact direction changer 404_3 also applies to the non-contact direction changer 404_1 which carries out a 90-degree direction change. Furthermore, the description for the non-contact direction changer 404_3 also applies to the non-contact direction changer 404_2 which carries out a 180-degree direction change, except that a portion in the form of a sector with a central angle of 180 degrees is divided into a plurality of passages arranged along the circumferential direction in (a) of FIG. 10.

A method of producing an optical fiber wire 10 with use of the thus-configured non-contact direction changers 404_1 to 404_3 is the same as the method S1 of producing an optical fiber wire in accordance with one or more embodiments of the present invention discussed with reference to FIG. 5.

According to one or more embodiments, since there are a plurality of bottom ejection openings at the bottom of a guide groove, it is possible to more appropriately control the flow rate of air that serves to allow a bare fiber to float, as compared to a case where a single continuous bottom ejection opening is provided.

[Other Variations]

The foregoing embodiments are described with the examples in which the guide groove 1043 has side ejection opening groups 1043b on both of the opposite side surfaces thereof. Note, however, that embodiments are not limited as such, provided that the guide groove 1043 has a side ejection opening group(s) 1043b on at least one of the side surfaces thereof. Even in a case where such an arrangement is employed, one or more embodiments make it possible to reduce the frequency of contact between the optical fiber and at least one of the side surfaces.

The foregoing embodiments are described with the examples in which the relationship in size between the bottom ejection opening 1043a and the side ejection openings 1043bi is specified in terms of opening size. Embodiments are not limited as such. The relationship in size between the bottom ejection opening 1043a and the side ejection openings 1043bi may be specified in terms of open area (opening area). In this case, the open area of at least one of the side ejection openings 1043bi is smaller than the open area of the bottom ejection opening 1043a. Note that the side ejection opening group(s) 1043b may include a side ejection opening(s) 1043bi having a greater open area than that of the bottom ejection opening 1043a.

Also in one or more embodiments, the relationship in size between the bottom ejection openings 4043a_1 and 4043a_2 and the side ejection openings 1043bi may be specified in terms of open area. In this case, the relationship can be specified in the following manner (1) or (2). (1) The open area of at least one of the side ejection openings 1043bi may be smaller than the open area of each of the bottom ejection openings 4043a_1 and 4043a_2. Note, however, that, in this case, the side ejection opening group(s) 1043b may include a side ejection opening(s) 1043bi having a larger open area than that of each of the bottom ejection openings 4043a. (2) The open area of at least one of the side ejection openings 1043bi may be smaller than a statistical value (such as minimum value, average value, maximum value) of the open areas of the bottom ejection openings 4043a_1 and 4043a_2. Note, however, that, in this case, the side ejection opening group(s) 1043b may include a side ejection opening(s) 1043bi having an open area greater than a statistical value of the open areas of the bottom ejection openings 4043a_1 and 4043a_2.

The foregoing embodiments are described with the examples in which a porous member is made of a porous material; however, the embodiments are not limited as such. The porous member may be a material that has a plurality of through-holes that extend from an air passage to a guide groove. For example, a non-contact direction changer 104A, which is a modified version of the non-contact direction changer 104 in accordance with one or more embodiments in which the above-mentioned material is used, is discussed with reference to FIG. 11. FIG. 11 is a cross-sectional view of a guide groove 1043 and its surroundings of the non-contact direction changer 104A. In FIG. 11, the non-contact direction changer 104A includes porous members 5041b each having a plurality of holes, instead of the porous members 1041b each made of a porous material. The holes of each porous member 5041b pass through the porous member 5041b from a second passage 1044b to reach inside the guide groove 1043. The opening of each of the holes in taper faces constitutes a side ejection opening 1043bi. The porous member 5041b may be, for example, a metal material in which a plurality of holes are fabricated. The non-contact direction changer 104 modified in this manner also provides a similar effect to that of one or more embodiments.

The foregoing embodiments are described with the examples in which the two plates constituting a non-contact direction changer are in the form of a circular disc; however, the embodiments are not limited as such. The two plates may be in the form of a sector whose central angle is equal to or greater than the angle of direction change.

The foregoing embodiments are described with the examples in which a recess in a base member is in the shape of a trapezoid in cross section, a porous member is in the shape of a triangle in cross section, and a passage splitting member is in the shape of a pentagon in cross section. Note, however, that the cross-sectional shape of each constituent element may be some other shape. For example, the porous member may be in the shape of a trapezoid or a rectangle in cross section. When the cross-sectional shape of the porous member is a trapezoid or a rectangle, it is possible to further reduce variations in distance traveled by air that passes through the porous member and is discharged through side ejection openings, in the direction of dimension L of the porous member, as compared to a case in which the cross-sectional shape of the porous member is a triangle.

The foregoing embodiments are described with the examples in which a fluid used in a non-contact direction changer is air. Note, however, that some other fluid can be used in one or more embodiments.

The foregoing embodiments are described with the examples in which non-contact direction changers are located between the slow cooling section 102 and the temperature control section 105 and serve to change the direction of the bare fiber 11; however, the embodiments are not limited as such. A non-contact direction changer in accordance with one or more embodiments can be located at any position in the path of advancement of the optical fiber wire 10. For example, the non-contact direction changer may be located between the coating section 106 and the curing section 107. In this case, the non-contact direction changer changes the direction of advancement of an optical fiber wire 10α, whose coating 12 is uncured, in a non-contact manner. In a case where such an arrangement is employed in one or more embodiments, the frequency of contact between the optical fiber wire 10α and side surfaces of a guide groove is reduced even if the optical fiber wire 10α undergoes fiber shaking, and thus makes it possible to reduce the worsening of surface condition of the coating 12. Such modified embodiments make it possible to extend the optical fiber wire 10α, whose coating 12 is uncured, while changing the direction of advancement of the optical fiber wire 10a, and thus possible to contribute to an increase in drawing speed regardless of the size of a limited space inside a building.

Example 1

The following description will discuss an Example (Example 1) of one or more embodiments of the present invention. In Example 1, a production apparatus 1, including non-contact direction changers 104, was used to produce an optical fiber wire 10. In Example 1, the outer diameter of a bare fiber 11 is 125 μm, and drawing speed is 30 m/sec (meter per second).

In Example 1, the bend diameter of the bare fiber 11 which passes through the non-contact direction changers 104 is 125 mm. A width w of a bottom ejection opening 1043a at the bottom of a guide groove 1043 is 0.05 mm. The open area of the bottom ejection opening 1043a is 4.7 mm$^2$ in cases where the direction changer is a 90-degree direction changer, and is 9.4 mm$^2$ in a case where the direction changer is a 180-degree direction changer. The angle θ at which the guide groove 1043 tapers (slanted) is 0.5 degrees. A dimension L in the depth direction of a portion of each side surface of the guide groove 1043, which portion is constituted by a porous member 1041b, is 10 mm. A material for the porous member 1041b is porous carbon having an average pore size of 4 μm. The average of open areas of holes in the porous carbon is $1.3 \times 10^{-5}$ mm$^2$.

The optical fiber wire 10 was produced with use of the production apparatus 1 configured as above. In so doing, at each non-contact direction changer 104 which is configured to change the direction of advancement of the bare fiber 11 by 90 degrees, air was supplied at 200 1/min (liter per minute) as air that is discharged through the bottom ejection opening 1043a and the side ejection opening groups 1043b on the opposite side surfaces. Specifically, air was supplied to the supply holes 1041e of the respective two plates 1041 at 200 l/min in total. At another non-contact direction changer 104 which is configured to change the direction of advancement of the bare fiber 11 by 180 degrees, air was supplied at 400 l/min as air that is discharged through the bottom ejection opening 1043a and the side ejection opening groups 1043b. Specifically, air was supplied to the supply holes 1041e of the respective two plates 1041 at 400 l/min min in total.

In Example 1, the optical fiber wire 10 was produced without breakage of the bare fiber 11.

The following discusses the result of checking breakage frequency for the optical fiber wire 10 produced in Example 1 by a proof test in accordance with IEC60793-1-30. Note that the breakage frequency was found using the equation: [Number of times optical fiber wire 10 was broken in the test (times)]/[Length of optical fiber wire 10 tested (km)]. The breakage frequency was 0.001 times/km.

Example 2

The following description will discuss an Example (Example 2) of one or more embodiments of the present invention. In Example 2, a production apparatus 3, including non-contact direction changers 304, was used to produce an optical fiber wire 10. Note that the outer diameter of a bare fiber 11 to be produced and drawing speed during the production are the same as those of Example 1. The bend diameter of the bare fiber 11, the width w of the bottom ejection opening 1043a, and the angle θ at which the guide groove 1043 tapers (slanted), for each non-contact direction changer 304, and a dimension L, material, average pore size, and average open area of the porous member 3041b are also the same as those of Example 1.

The optical fiber wire 10 was produced with use of the production apparatus 3 configured as above. In so doing, at each non-contact direction changer 304 which is configured to change the direction of advancement of the bare fiber 11 by 90 degrees, air was supplied at 100 l/min as air that is discharged through the bottom ejection opening 1043a. Specifically, air was supplied to the first supply holes 3041e of the respective two plates 3041 at 100 l/min in total. Furthermore, air was supplied at 15 l/min as air that is discharged through each of the side ejection opening groups 1043b on the opposite side surfaces. That is, the total flow rate of air supplied to the side ejection opening groups 1043b on the opposite side surfaces is less than the flow rate of air supplied to the bottom ejection opening 1043a. In this manner, air at 15 l/min in total was supplied to the second supply holes 3041g_1 to 3041g_3 of the plate 3041_1, and air at 15 l/min in total was supplied to the second supply holes 3041g_1 to 3041g_3 of the plate 3041_2.

At another non-contact direction changer 304 which is configured to change the direction of advancement of the bare fiber 11 by 180 degrees, air was supplied at 200 l/min as air that is discharged through bottom ejection opening 1043a. Specifically, air was supplied to the first supply holes 3041e of the respective two plates 3041 at 200l/min in total. Furthermore, air was supplied at 30 l/min as air that is discharged through each of the side ejection opening groups 1043b on the opposite side surfaces. Specifically, air at 30 l/min in total was supplied to the second supply holes 3041g_1 to 3041g_3 of the plate 3041_1, and air at 30 l/min in total was supplied to the second supply holes 3041g_1 to 3041g_3 of the plate 3041_2.

Also in Example 2, the optical fiber wire 10 was produced without breakage of the bare fiber 11.

The following discusses the result of checking breakage frequency for the optical fiber wire 10 produced in Example 2 by a proof test in accordance with IEC60793-1-30. The breakage frequency was 0.001 times/km.

In Example 2, the total flow rate of air that is passed through the first supply holes 3041e and the second supply holes 3041g_1 to 3041g_3 at each non-contact direction changer 304 configured to carry out a 90-degree direction change is 130 l/min. This is less than the total flow rate, 200 l/min, of air that is passed through the supply holes 1041e at each non-contact direction changer 104 configured to carry out a 90-degree direction change in Example 1. Furthermore, in Example 2, the total flow rate of air that is passed through the first supply holes 3041e and the second supply holes 3041g_1 to 3041g_3 at the non-contact direction changer 304 configured to carry out a 180-degree direction change is 260 l/min. This is less than the total flow rate, 400 l/min, of air that is passed through the supply holes 1041e of the non-contact direction changer 104 configured to carry out a 180-degree direction change in Example 1. As such, in Example 2, supply of air to the bottom ejection opening 1043a of the guide groove and supply of air to the side ejection opening groups 1043b on opposite side surfaces are carried out independently of each other, and thereby the total amount of necessary air can be reduced.

Comparative Example

For comparison with the foregoing Examples 1 and 2, an optical fiber wire 10 was produced with use of a production apparatus which is different from the production apparatus 1 illustrated in FIG. 2 in that the production apparatus includes, instead of the non-contact direction changers 104 or 304, conventional non-contact direction changers with no air supply holes formed in the side surfaces of a guide groove. FIG. 12 is a cross-sectional view of the guide groove and its surroundings of such a conventional non-contact direction changer. This Comparative Example employs the same arrangement as the foregoing Example 1, except that the features related to the supply holes in the side surfaces are omitted. Specifically, the outer diameter of a bare fiber 11 to be produced and drawing speed during the production are the same as those of Example 1. Furthermore, the bend diameter of the bare fiber 11, the width w of an air ejection opening at the bottom of the guide groove, and the angle θ at which the guide groove tapers (slanted), in regard to the conventional non-contact direction changers, are the same as those of Example 1.

As a result, in the Comparative Example, the bare fiber 11 was broken once near the conventional non-contact direction changers while the drawing speed was being adjusted. Drawing was started again, and the optical fiber wire 10 was produced without further breakage of the bare fiber 11.

The following discusses the result of checking breakage frequency for the optical fiber wire 10 produced in the Comparative Example by a proof test in accordance with IEC60793-1-30.The breakage frequency was 0.003 times/km.

As is clear from above, according to a method of producing an optical fiber wire using one or more embodiments of the present invention, an optical fiber wire with less breakage frequency was produced than a case where conventional non-contact direction changers were used.

Note that the width of a bottom ejection opening of a guide groove (opening size of bottom ejection opening) and the average pore size of a porous member that defines side ejection openings (opening size of side ejection opening) shown in the above Examples are mere examples, and are not limited to the example values.

[Remarks]

The present invention is not limited to the foregoing embodiments, variations, or examples, but can be altered by a skilled person in the art within the scope of the claims. The present invention also encompasses, in its technical scope, any embodiments derived by combining technical means disclosed in differing embodiments, variations, or examples.

One or more embodiments of the present invention can also be expressed as follows:

A non-contact direction changer (104, 204, 304, 404) in accordance with the foregoing embodiments includes: a guide groove (1043) configured to guide an optical fiber so that a direction of advancement of the optical fiber changes from a first direction to a second direction; a bottom ejection opening (1043a, 4043a_1, 4043a_2) which is provided at a bottom of the guide groove (1043) and through which a fluid is ejected into the guide groove (1043); and one or more side ejection openings (1043b) which are provided on at least one of opposite side surfaces of the guide groove (1043) and through which a fluid is ejected into the guide groove (1043).

According to the above arrangement, a fluid is ejected through the side ejection opening(s) (1043b). This reduces the frequency of contact between the optical fiber and the side surfaces of the guide groove (1043).

The non-contact direction changer (104, 204, 304, 404) in accordance with the foregoing embodiments may be arranged such that at least one of the one or more side ejection openings (1043b) is smaller in opening size than the bottom ejection opening (1043a, 4043a_1, 4043a_2).

The non-contact direction changer (104, 204, 304, 404) in accordance with the foregoing embodiments may be arranged such that at least one of the one or more side ejection openings (1043b) is smaller in open area than the bottom ejection opening (1043a, 4043a_1, 4043a_2).

The non-contact direction changer (104, 204, 304, 404) in accordance with the foregoing embodiments may be arranged such that: in a case where the one or more side ejection openings (1043b) is one side ejection opening (1043b), a flow rate of a fluid supplied to the one side ejection opening (1043b) is less than a flow rate of a fluid supplied to the bottom ejection opening (1043a, 4043a_1, 4043a_2); in a case where the one or more side ejection openings (1043b) are two or more side ejection openings (1043b), a total flow rate of a fluid supplied to the two or more side ejection openings (1043b) is less than a flow rate of a fluid supplied to the bottom ejection opening (1043a, 4043a_1, 4043a_2).

According to each of the above arrangements, a fluid ejected through the side ejection opening(s) (1043b) is less in amount than a fluid ejected through the bottom ejection opening(s) (1043a, 4043a_1, 4043a_2). This reduces the likelihood of the fluid ejected through the side ejection opening(s) (1043b) and the fluid ejected through the bottom ejection opening(s) (1043a, 4043a_1, 4043a_2) interfering with each other to form turbulence. This makes it possible to reduce the likelihood of the optical fiber being shaken in the turbulence, and thus reduces the frequency of contact between the optical fiber and the side surfaces of the guide groove (1043).

The non-contact direction changer (104, 204, 304, 404) in accordance with the foregoing embodiments may be arranged such that a direction in which the fluid is ejected through the one or more side ejection openings (1043*b*) includes a direction component that goes away from the bottom ejection opening (1043*a*, 4043*a*_1, 4043*a*_2).

According to the above arrangement, in a case where fiber shaking of the optical fiber in the width direction of the guide groove (1043) occurs, a fluid ejected through the side ejection opening(s) (1043*b*) causes the optical fiber to move in a direction going away from the bottom.

It follows that the fluid ejected through the side ejection opening(s) (1043*b*) prevents the bare fiber (11) from approaching the bottom. It is also possible to prevent the fluid ejected through the side ejection opening(s) (1043*b*) from interfering with the fluid ejected through the bottom ejection opening(s) (1043*a*, 4043*a*_1, 4043*a*_2).

The non-contact direction changer (104, 204, 304, 404) in accordance with the foregoing embodiments may be arranged such that the one or more side ejection openings (1043*b*) are provided on each of the opposite side surfaces of the guide groove.

According to the above arrangement, a fluid is ejected through the side ejection openings (1043*b*) on both of the side surfaces of the guide groove (1043). This reduces the frequency of contact between the optical fiber and the side surfaces of the guide groove (1043).

The non-contact direction changer (104, 204, 304, 404) in accordance with the foregoing embodiments may be arranged such that: the one or more side ejection openings (1043*b*) are two or more side ejection openings (1043*b*); and the two or more side ejection openings (1043*b*), which are provided on at least one of the opposite side surfaces of the guide groove (1043), are dispersed along at least a height direction of the guide groove (1043).

According to the above arrangement, even if the height at which the optical fiber is kept within the guide groove (1043) undergoes small fluctuations, air ejected through a side ejection opening(s) (1043*b*) at a position corresponding to that height recues the frequency of contact between the optical fiber and the side surfaces of the guide groove (1043).

The non-contact direction changer (104, 204, 304, 404) in accordance with the foregoing embodiments may be arranged such that: at least one of the opposite side surfaces of the guide groove (1043) includes a portion made of a porous material; and the two or more side ejection openings (1043*b*) are constituted by pores in the porous material.

According to the above arrangement, a plurality of side ejection openings (1043*b*) can be provided on each of the opposite side surfaces of the guide groove (1043) in a dispersed manner. Furthermore, a fluid to be ejected through the side ejection openings (1043*b*) loses its pressure when passing through the porous members (1041*b*, 2041*b*, 3041*b*, 4041*b*_1, 4041*b*_2, 5041*b*), and thereby the amount of the fluid ejected through the side ejection openings (1043*b*) can be reduced.

The non-contact direction changer (104, 204, 304, 404) in accordance with the foregoing embodiments may be arranged such that a pressure that the optical fiber receives from the fluid ejected through the one or more side ejection openings (1043*b*) is less than a pressure that the optical fiber receives from the fluid ejected through the bottom ejection opening (1043*a*, 4043*a*_1, 4043*a*_2).

According to the above arrangement, it is possible to reduce the likelihood that the height at which the bare fiber (11) is kept within the guide groove (1043) will greatly fluctuate due to the fluid ejected through the side ejection opening(s) (1043*b*).

The non-contact direction changer (104, 204, 304, 404) in accordance with the foregoing embodiments may be arranged such that a fluid supplied to the one or more side ejection openings (1043*b*) and a fluid supplied to the bottom ejection opening (1043*a*, 4043*a*_1, 4043*a*_2) are from respective different sources.

According to the above arrangement, the amount of a fluid ejected through the bottom ejection opening(s) (1043*a*, 4043*a*_1, 4043*a*_2) and the amount of a fluid ejected through the side ejection opening(s) (1043*b*) can be appropriately controlled independently of each other. This makes it possible to reduce the total amount of a fluid supplied in order to reduce the frequency of contact between the optical fiber and the side surfaces of the guide groove.

The non-contact direction changer (104, 204, 304, 404) in accordance with the foregoing embodiments may be arranged such that a fluid supplied to the one or more side ejection openings (1043*b*) and a fluid supplied to the bottom ejection opening (1043*a*, 4043*a*_1, 4043*a*_2) are from a single source.

According to the above arrangement, it is possible to employ a simple configuration of a fluid source that supplies a fluid to the non-contact direction changer of the present invention.

The non-contact direction changer (104, 204, 304, 404) in accordance with the foregoing embodiments may be arranged such that: a passage of a fluid supplied to the bottom ejection opening (1043*a*, 4043*a*_1, 4043*a*_2), at a position short of the bottom ejection opening (1043*a*, 4043*a*_1, 4043*a*_2), is parallel to a depth direction of the guide groove; and a passage of a fluid supplied to the one or more side ejection openings (1043*b*), at a position short of the one or more side ejection openings (1043*b*), is parallel to a width direction of the guide groove (1043).

According to the above arrangement, even if the height at which the bare fiber (11) is kept within the guide groove (1043) undergoes small fluctuations, an appropriate amount of air can be ejected through a side ejection opening(s) (1043*b*) at a position corresponding to that height.

A method of producing an optical fiber in accordance with the foregoing embodiments includes, in a production line in which an optical fiber is produced by drawing a preform, the step of changing a direction of advancement of the optical fiber with use of any of the above-described non-contact direction changers.

According to the above arrangement, it is possible to change the direction of advancement of an intermediate product of an optical fiber (such as a bare fiber (11) or an optical fiber whose coating (12) is uncured) at any position in an optical fiber production line. This makes it possible to extend the production line and contribute to an increase in drawing speed even within a limited space.

Although the disclosure has been described with respect to only a limited number of embodiments, those skilled in the art, having benefit of this disclosure, will appreciate that various other embodiments may be devised without departing from the scope of the present invention. Accordingly, the scope of the invention should be limited only by the attached claims.

REFERENCE SIGNS LIST 1, 2, 3, 4 production apparatus
10, 10α optical fiber wire
11 bare fiber
12 coating
101 drawing section
102 slow cooling section
104, 204, 304, 404 non-contact direction changer
105 temperature control section
106 coating section
107 curing section
108 outer diameter measurer
109 haul-off section
110 take-up section
111 pulley
1041, 2041, 3041, 4041 plate
1041a, 2041a, 3041a, 4041a base member
1041b, 2041b, 3041b, 4041b_1, 4041b_2, 5041b porous member
1041c, 4041c_1, 4041c_2 passage splitting member
1041e supply hole
1043 guide groove
1043a, 4043a_1, 4043a_2 bottom ejection opening
1043b side ejection opening
3041e first supply hole
3041g_1, 3041g_2, 3041g_3 second supply hole

The invention claimed is:

1. A non-contact direction changer comprising:
a guide groove that guides an optical fiber and changes a direction of advancement of the optical fiber from a first direction to a second direction;
a bottom ejection opening, provided at a bottom of the guide groove, through which fluid is ejected into the guide groove to cause the optical fiber to float; and
one or more side ejection openings, provided on at least one of opposite side surfaces of the guide groove, through which fluid is ejected into the guide groove, wherein
each of the opposite side surfaces includes an inclined portion that is inclined such that an opening of the guide groove is continuously larger as the opening is farther from the bottom of the guide groove, and
the one or more side ejection openings are provided on the inclined portion.

2. The non-contact direction changer according to claim 1, wherein directions in which the fluid is ejected through the one or more side ejection openings have a direction component that goes away from the bottom ejection opening.

3. The non-contact direction changer according to claim 1, wherein the one or more side ejection openings are disposed on each opposite side surface of the guide groove.

4. The non-contact direction changer according to claim 1, wherein
the non-contact direction changer has two or more side ejection openings, and
the two or more side ejection openings are dispersed along at least a height direction of the guide groove.

5. The non-contact direction changer according to claim 4, wherein
at least one of the opposite side surfaces of the guide groove comprises a portion made of a porous material, and
the two or more side ejection openings are pores in the porous material.

6. The non-contact direction changer according to claim 1, wherein a pressure that the optical fiber receives from the fluid ejected through the one or more side ejection openings is less than a pressure that the optical fiber receives from the fluid ejected through the bottom ejection opening.

7. The non-contact direction changer according to claim 1, wherein a fluid supplied to the one or more side ejection openings and a fluid supplied to the bottom ejection opening are from different sources.

8. The non-contact direction changer according to claim 1, wherein a fluid supplied to the one or more side ejection openings and a fluid supplied to the bottom ejection opening are from a single source.

9. The non-contact direction changer according to claim 1, wherein
a direction of flow of a fluid supplied to the bottom ejection opening, at a position short of the bottom ejection opening, is parallel to a depth direction of the guide groove, and
a direction of flow of a fluid supplied to the one or more side ejection openings, at a position short of the one or more side ejection openings, is parallel to a width direction of the guide groove.

10. The non-contact direction changer according to claim 1, wherein
the non-contact direction changer has two or more side ejection openings, and
a total flow rate of a fluid through the two or more side ejection openings is less than a flow rate of a fluid through the bottom ejection opening.

11. The non-contact direction changer according to claim 1, wherein at least one of the one or more side ejection openings has a smaller opening size than that of the bottom ejection opening.

12. The non-contact direction changer according to claim 1, wherein at least one of the one or more side ejection openings has a smaller opening area than that of the bottom ejection opening.

13. A method of producing an optical fiber, comprising:
changing a direction of advancement of the optical fiber using, in a production line in which the optical fiber is produced by drawing a preform, the non-contact direction changer according to claim 1.

14. A non-contact direction changer comprising:
a guide groove that guides an optical fiber and changes a direction of advancement of the optical fiber from a first direction to a second direction;
a bottom ejection opening at a bottom of the guide groove, wherein a fluid is ejected into the guide groove through the bottom ejection opening; and
one or more side ejection openings on at least one of opposite side surfaces of the guide groove, wherein a fluid is ejected into the guide groove through the one or more side ejection openings, wherein
the non-contact direction changer has exactly one side ejection opening, and
a flow rate of a fluid through the one side ejection opening is less than a flow rate of a fluid through the bottom ejection opening.

* * * * *